United States Patent
Oshima et al.

(10) Patent No.: US 7,024,572 B2
(45) Date of Patent: Apr. 4, 2006

(54) DATA PROCESSING APPARATUS

(75) Inventors: Mitsuaki Oshima, Kyoto (JP);
Yoshihiro Gohara, Toyono-gun (JP);
Yoshinori Kobayashi, Hirakata (JP);
Shozo Fujiwara, Ibaraki (JP); Tsuyoshi Uemura, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 233 days.

(21) Appl. No.: 10/425,878

(22) Filed: Apr. 30, 2003

(65) Prior Publication Data

US 2003/0193468 A1 Oct. 16, 2003

Related U.S. Application Data

(62) Division of application No. 10/194,687, filed on Jul. 24, 2002, now Pat. No. 6,804,791, which is a division of application No. 09/583,168, filed on May 30, 2000, now Pat. No. 6,535,985, which is a continuation of application No. 08/283,165, filed on Aug. 3, 1994, now abandoned, which is a continuation of application No. 07/671,929, filed on Mar. 20, 1991, now abandoned.

(30) Foreign Application Priority Data

Mar. 23, 1990 (JP) ............................................. 02-73737

(51) Int. Cl.
G06F 1/32 (2006.01)

(52) U.S. Cl. ........................................ 713/323; 713/324
(58) Field of Classification Search .......... 713/300–340
See application file for complete search history.

(56) References Cited

U.S. PATENT DOCUMENTS

| 4,109,315 A | 8/1978 | Pan |
| 4,409,665 A | 10/1983 | Tubbs |
| 4,411,495 A * | 10/1983 | Beni et al. ................... 349/91 |
| 4,747,041 A | 5/1988 | Engel et al. |

(Continued)

FOREIGN PATENT DOCUMENTS

| EP | 0121070 | 10/1984 |
| EP | 0175935 | 4/1986 |
| GB | 2134676 | 8/1984 |
| JP | 49-63480 | 6/1974 |

(Continued)

OTHER PUBLICATIONS

"Macintosh Portable", Nikkei Electronics Nov. 13, 1989, pp. 183–186.
"Dynabook", Nikkei Electronics Aug. 7, 1989, pp. 181–186.

*Primary Examiner*—Dennis M. Butler
(74) *Attorney, Agent, or Firm*—Wenderoth, Lind & Ponack, L.L.P.

(57) ABSTRACT

A data processing apparatus has a first processing unit for processing an input data, a second processing unit responsive to the data processed by the first processing unit for executing a processing dependent on the data and producing a display data, and a display unit having a display drive unit and a display device for displaying the display data. The second processing unit is selectively inactivated and activated under control of the first processing unit to reduce power consumption in the second processing unit. The display drive unit is also selectively inactivated and activated under control of the first processing unit to reduce power consumption in the display unit. The display device has a memory function that maintains its display image even when supply of a display drive signal from the display drive unit is stopped, so that a latest image before inactivation of the second processing unit and/or the display drive unit for power consumption reduction is visible by an operator during the inactivated and low power consumption state of the apparatus.

7 Claims, 32 Drawing Sheets

U.S. PATENT DOCUMENTS

| | | | |
|---|---|---|---|
| 4,791,418 A | 12/1988 | Kawahara et al. | |
| 4,851,987 A | 7/1989 | Day | |
| 4,945,424 A * | 7/1990 | Hiroki et al. | 386/118 |
| 4,964,073 A | 10/1990 | Watanabe | |
| 4,964,699 A | 10/1990 | Inoue | |
| 4,999,794 A | 3/1991 | Yakushiji | |
| 5,058,203 A | 10/1991 | Inagami | |
| 5,065,357 A | 11/1991 | Shiraishi et al. | |
| 5,078,476 A | 1/1992 | Shin | |
| 5,083,266 A | 1/1992 | Watanabe | |
| 5,142,684 A | 8/1992 | Perry et al. | |
| 5,163,153 A | 11/1992 | Cole et al. | |
| 5,167,024 A | 11/1992 | Smith et al. | |
| 5,182,810 A | 1/1993 | Bartling et al. | |
| 5,214,785 A | 5/1993 | Fairweather | |
| 5,239,652 A | 8/1993 | Seibert et al. | |
| 5,241,680 A | 8/1993 | Cole et al. | |
| 5,293,494 A | 3/1994 | Saito et al. | |
| 5,313,225 A | 5/1994 | Miyadera | |
| 5,404,546 A | 4/1995 | Stewart | |
| 5,493,685 A | 2/1996 | Zenda | |
| 5,642,128 A | 6/1997 | Inoue | |
| 5,850,358 A | 12/1998 | Danielson et al. | |
| RE36,189 E | 4/1999 | Carter et al. | |
| 6,243,820 B1 * | 6/2001 | Rosch | 713/322 |
| 6,535,985 B1 | 3/2003 | Oshima et al. | |

FOREIGN PATENT DOCUMENTS

| | | |
|---|---|---|
| JP | 54-183281 | 8/1981 |
| JP | 56-102576 | 8/1981 |
| JP | 56-132654 | 10/1981 |
| JP | 57-92932 | 6/1982 |
| JP | 58-159517 | 9/1983 |
| JP | 59-20352 | 2/1984 |
| JP | 59-107380 | 6/1984 |
| JP | 60-241116 | 11/1985 |
| JP | 61-182123 | 8/1986 |
| JP | 61-215588 | 9/1986 |
| JP | 61-255420 | 11/1986 |
| JP | 61-262826 | 11/1986 |
| JP | 61-288725 | 12/1986 |
| JP | 62-141589 | 6/1987 |
| JP | 62-169219 | 7/1987 |
| JP | 62-200414 | 9/1987 |
| JP | 62-167466 | 10/1987 |
| JP | 62-294223 | 12/1987 |
| JP | 63-53626 | 3/1988 |
| JP | 63-142453 | 6/1988 |
| JP | 63-243922 | 10/1988 |
| JP | 63-292312 | 11/1988 |
| JP | 64-19386 | 1/1989 |
| JP | 64-066719 | 3/1989 |
| JP | 1-92826 | 4/1989 |
| JP | 64-91122 | 4/1989 |
| JP | 1-118915 | 5/1989 |
| JP | 1-175015 | 7/1989 |
| JP | 01-177623 | 7/1989 |
| JP | 1-189685 | 7/1989 |
| JP | 1-228006 | 9/1989 |
| JP | 1-237810 | 9/1989 |
| JP | 1-251120 | 10/1989 |
| JP | 1-280787 | 11/1989 |
| JP | 1-293742 | 11/1989 |
| JP | 2-29684 | 1/1990 |
| JP | 2-82306 | 3/1990 |
| JP | 2-178818 | 7/1990 |
| JP | 3-22222 | 3/1991 |
| JP | 3-120515 | 5/1991 |
| JP | 04-153714 | 5/1992 |
| JP | 5-33112 | 8/1993 |

* cited by examiner

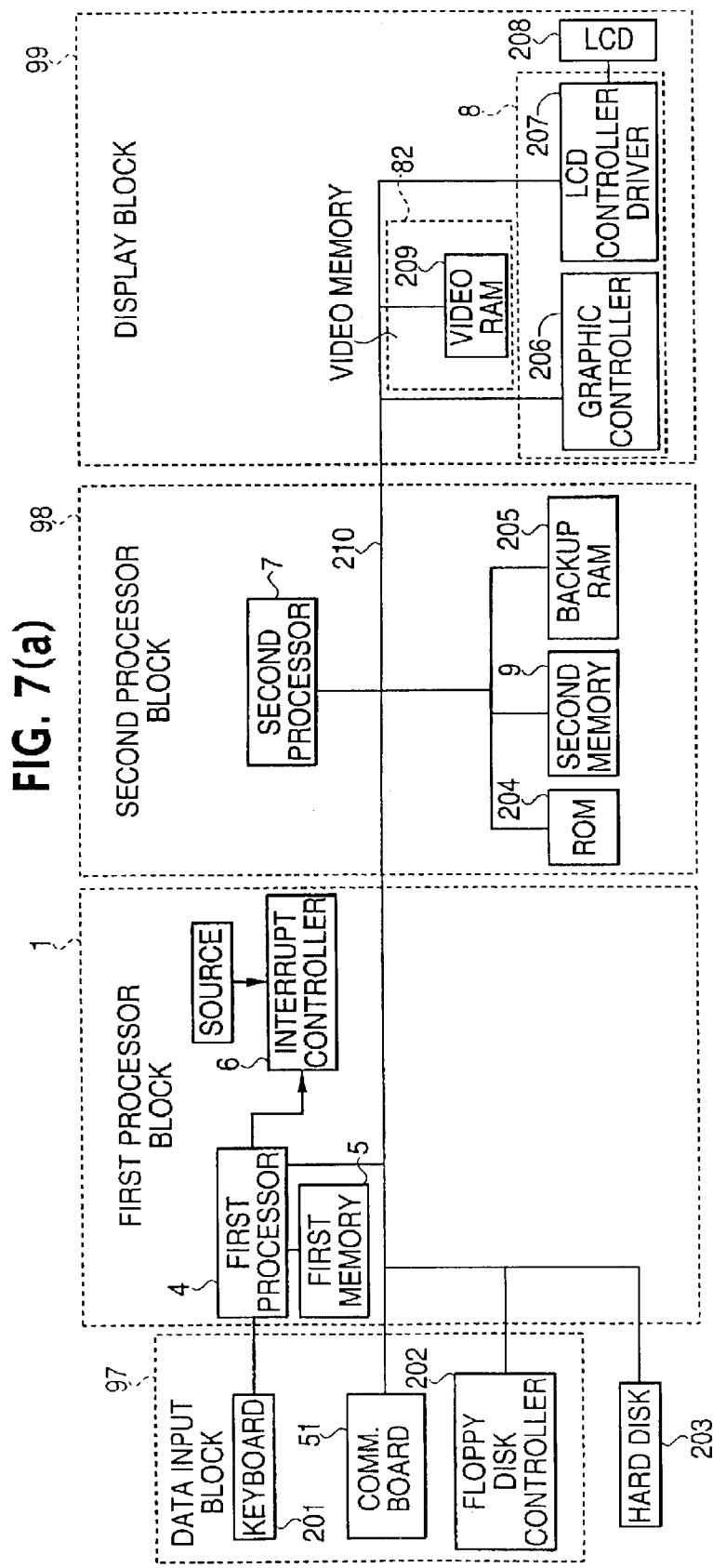

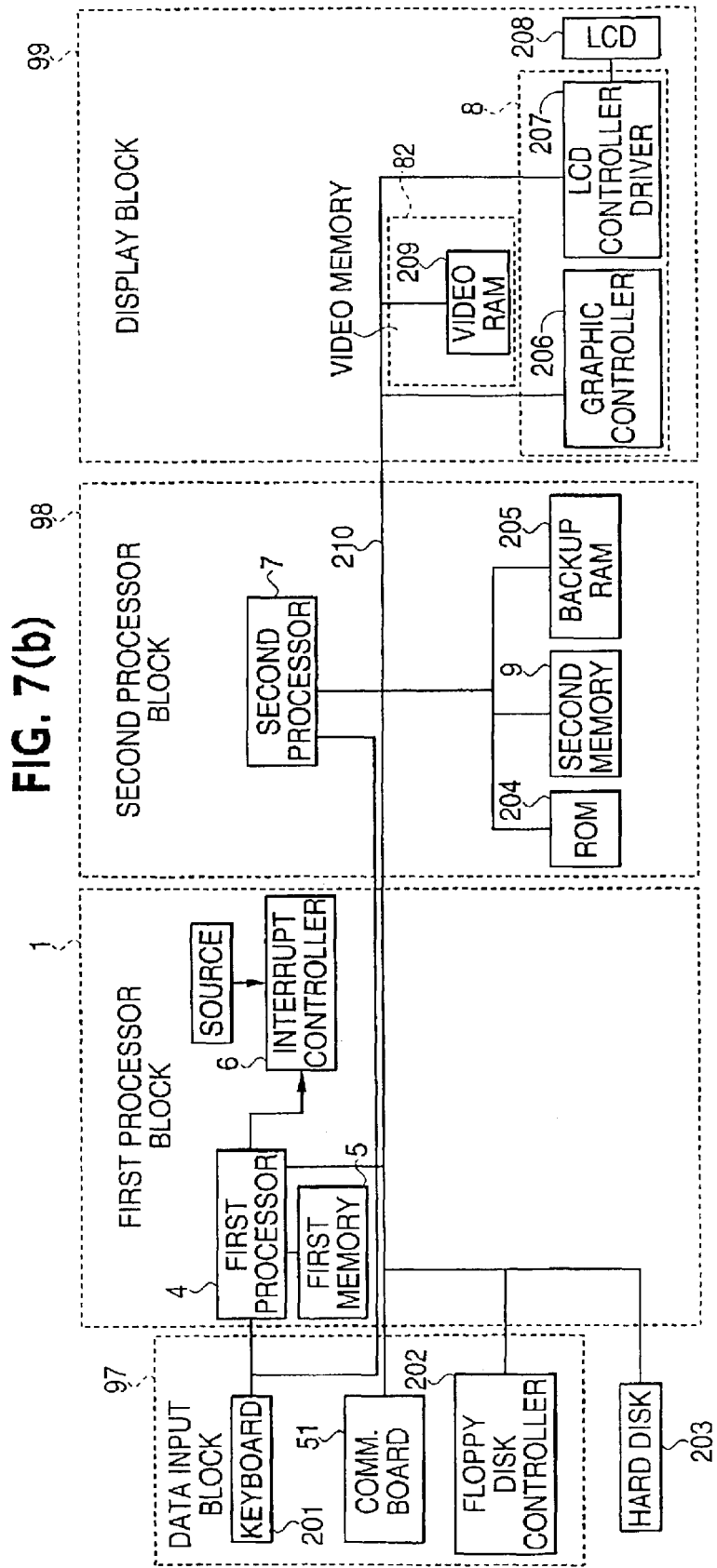

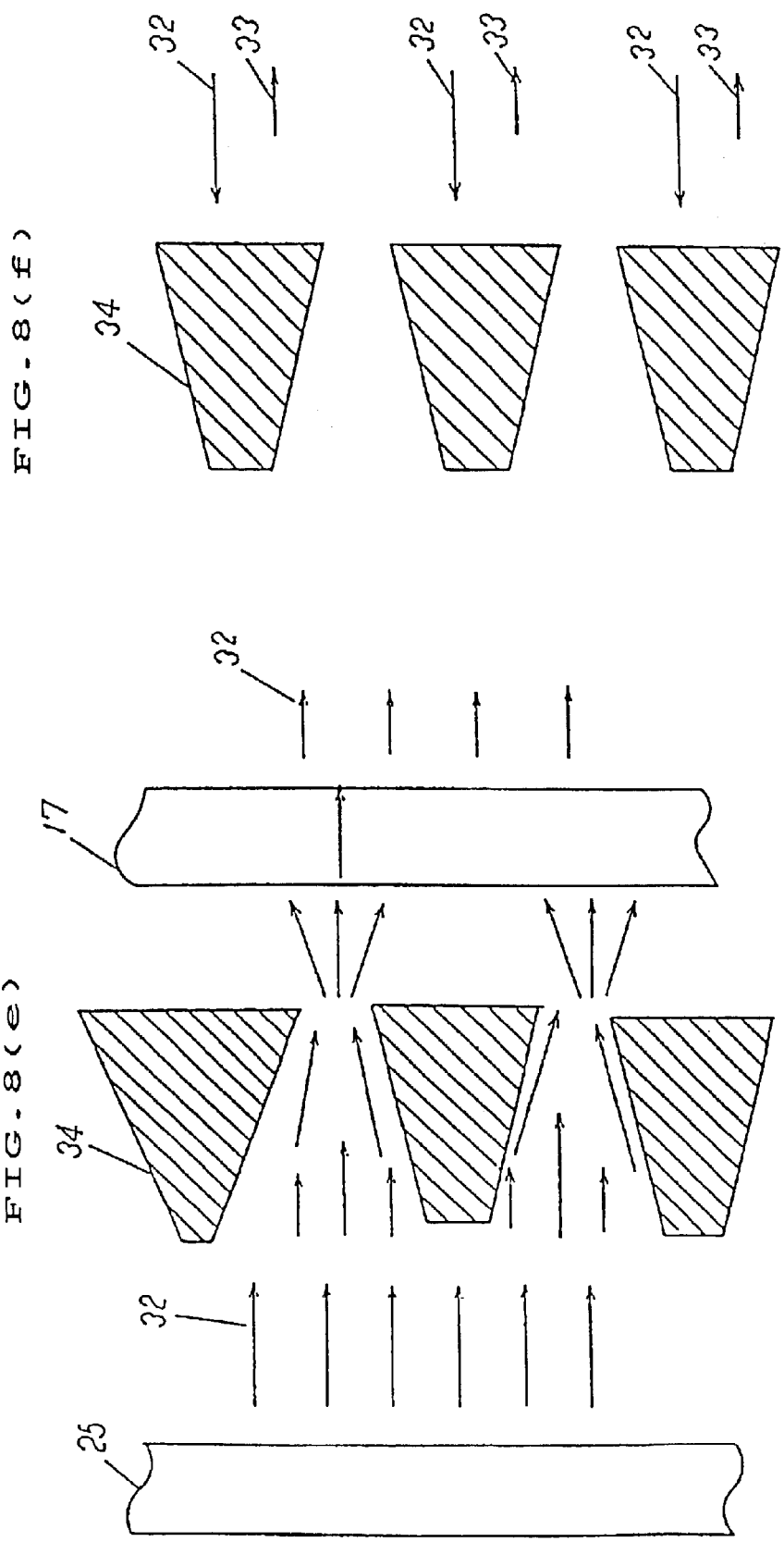

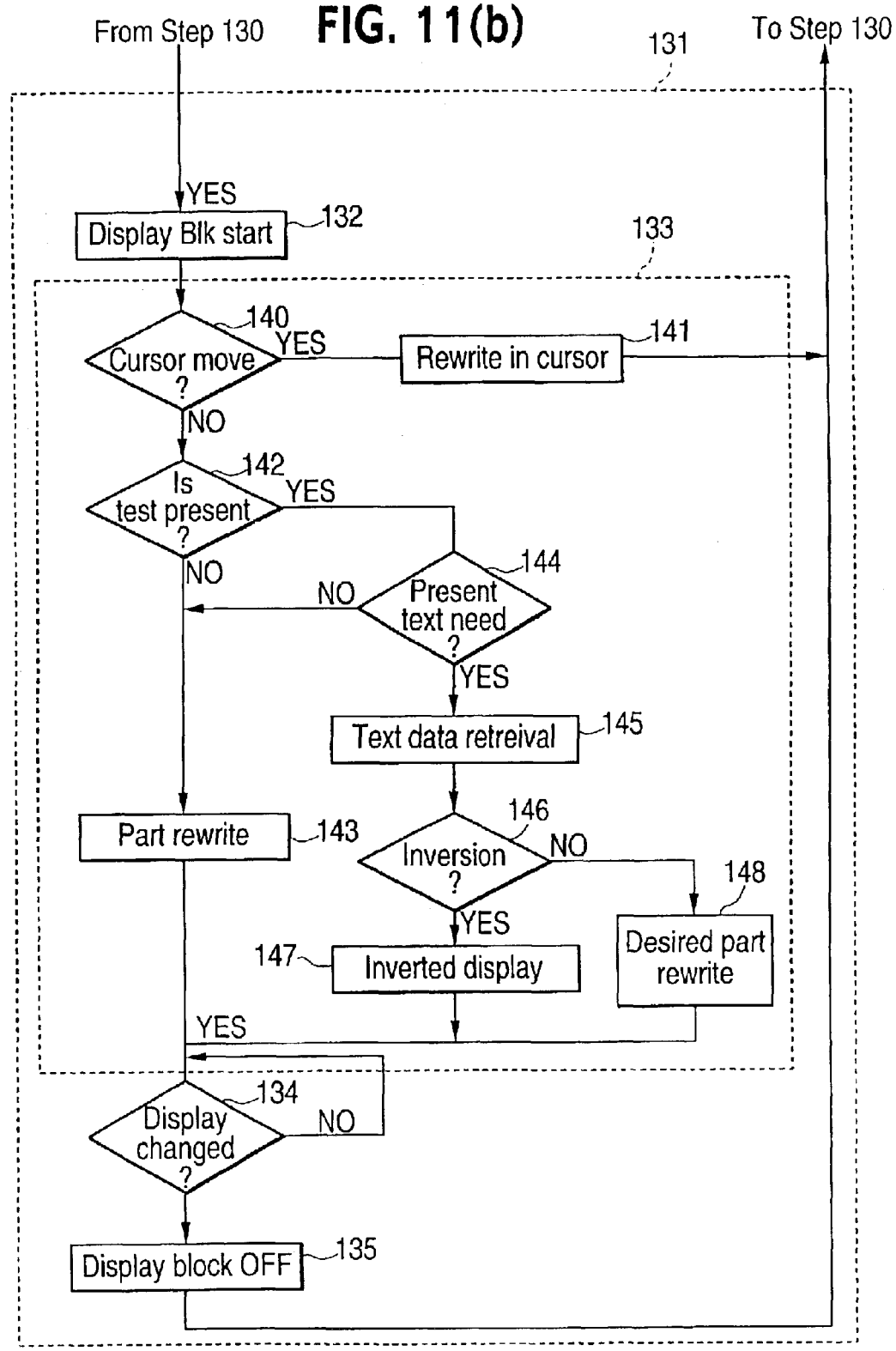

FIG. 13

(a)  [He] is  a Japanese
     I am a American (b)  He is  a Japanese
     I am a [A]merican (c)  <u>He</u> is  a Japanese
     I am a American (d)  He is  a Japanese
     I am a <u>A</u>merican FIG. 14
(a) 
(b) 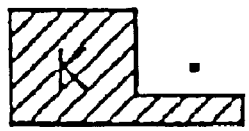
(c) 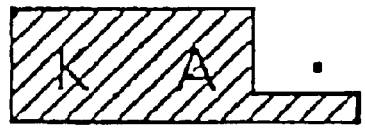
(d) 
(e) 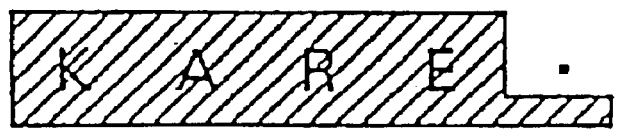
(f) 
(g) 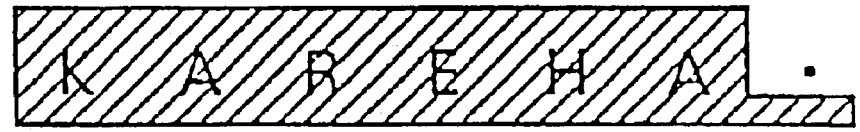
(h) 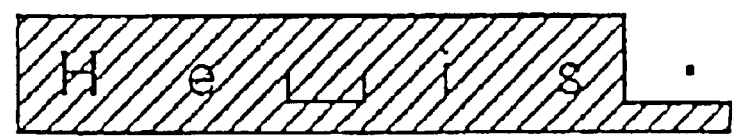

(a)    He is a   man. And I am (b)    He is a   an. And I am (c)    He is a       And I am (d)    He is a   n. And I am (e)    He is a         I am (f)    He is a teacher. And I am
```

FIG. 16

(a) He is a man、And (b) He is a man. And (c) He is a man. And (d) He is a man. And (e) He is a man. And (f) He is a man. And · · ·

(g) He is a man. And He is a man

DATA PROCESSING APPARATUS

This is a Rule 53b Divisional Application of Ser. No. 10/194,687 filed Jul. 24, 2002 now U.S. Pat No. 6,804,791 which is a Rule 53b Divisional Application of Ser. No. 09/583,168 filed May 30, 2000 now U.S. Pat No. 6,535,985, which is a Rule 53b Continuation Application of Ser. No. 08/283,165 filed Aug. 3, 1994 which is abandoned, which is a Rule 62 Continuation Application of Ser. No. 07/671,929 filed Mar. 20, 1991 which is abandoned.

BACKGROUND OF THE INVENTION

1. Field of the Invention

The present invention relates to a data processing apparatus provided with a display device.

2. Description of the Prior Art

Among compact and lightweight microcomputers, portable type computers powered by batteries are now used extensively. Particularly, one of them known as a note-size computer is lighter in weight and smaller in size, yet provides equal capabilities to those of a desktop or laptop computer. The note-size computer powered by batteries is handy for use in a place where a power supply facility is rarely available, e.g. a meeting room or a lecture hall.

However, the disadvantage of such handy use is that the life of batteries is short and limited. When used to record a business meeting or a college lecture, the service duration of such a note-size computer with fully charged batteries is preferably 10 hours nonstop; more preferably, 20 to 30 hours. If possible, more than 100 hours—a standard of hand calculators—is most desired.

So far, the service operation of a commercially available note-size computer lasts 2 to 3 hours at best. This results in battery runout in the middle of a meeting or college lecture causing an interruption during input work. As a result, troublesome replacement of batteries with new ones will be needed at considerable frequency.

Such a drawback of the note-size computer tends to offset the portability in spite of its light weight and compactness.

It is understood that known pocket-type portable data processing apparatuses including hand calculators and electronic notebooks are much slower in processing speeds than common microcomputers and thus, exhibit less power requirements. They are capable of servicing for years with the use of a common primary cell(s) of which life will thus be no matter of concern. The note-size computer, however, has a processing speed as high as that of a desktop computer and consumes a considerable amount of electric energy-namely, 10 to 1000 times the power consumption of any pocket-type portable data processing apparatus. Even with the application of up-to-date high quality rechargeable batteries, the serving period will be 2 to 3 hours at maximum. This is far from a desired duration demanded by the users. For the purpose of compensating the short life of batteries, a number of techniques for energy saving have been developed and some are now in practical use.

The most well known technique will now be explained.

A "resume" function is widely used in a common note-size computer. It works in a manner that when no input action continues for a given period of time, the data needed for restarting the computer with corresponding information is saved in a nonvolatile IC memory and then, a CPU and a display are systematically turned off. For restart, a power switch is closed and the data stored in the IC memory is instantly retrieved for display of the preceding data provided before disconnection of the power supply. This technique is effective for extension of the battery servicing time and suitable in practical use.

However, a specified duration, e.g. 5 minutes, of no key entry results in de-energization of the entire system of the computer and thus, disappearance of display data. Accordingly, the operator loses information and his input action is interrupted. For reviewing the display data or continuing the input action, the power switch has to be turned on each time. This procedure is a nuisance for the operator. The resume technique is advantageous in saving energy of battery power but very disadvantageous in operability of the note-size computer.

More specifically, the foregoing technique incorporates as a means for energy saving a system which de-energizes all the components including a processing circuit and a display circuit. The operator is thus requested to turn on the power switch of the computer at considerable frequencies during intermittent data input action because each no data entry duration of a given length triggers automatic disconnection of the switch. In particular, the data input operation with a note-size computer is commonly intermittent and thus, the foregoing disadvantage will be much emphasized.

SUMMARY OF THE INVENTION

It is an object of the present invention to provide an improved data processing apparatus capable of substantially reducing power consumption while performing required data processing operations.

A data processing apparatus according to the present invention comprises: a data input unit for input of external data; a first processing unit for processing the data inputted through the data input unit; a second processing unit for processing the data inputted through the data input unit and/or an output data of the first processing unit; and a display unit for displaying an output data of the first and/or second processing units, wherein the display unit has a memory function for maintaining a display state without being energized, and the first processing unit has a means for actuating the second processing unit according to a timing or a kind of the input data.

For example, when no data entry continues, the second processing unit or the display unit is inactivated or decreased in clock rate thus diminishing power consumption. Also, the present invention allows the display of data to remain intact. Upon occurrence an input data, the first processing unit activates the second processing unit to process the data. Thus, the operator can prosecute his job without knowledge of an interrupted de-energization. As a result, an appreciable degree of energy saving is guaranteed without affecting the operability and thus, the service life of batteries will largely be increased.

In another aspect, the first processing unit may activate the second processing unit according to the kind of the input data. When the input data is such a data that requires a processing in the second processing unit, the first processing unit activates the second processing unit. The second processing unit, after completing a required operation or processing, may enter an inactive state by itself or may be forced into the inactive state by the first processing unit. Thus, the power consumption will be reduced to a considerable rate without affecting the operability.

BRIEF DESCRIPTION OF THE DRAWINGS

FIG. 7-b is a block diagram showing another arrangement;

FIG. 7-c is a block diagram showing a further arrangement;

FIG. 7-d is a flow chart;

FIGS. 8(a) through 8(f) illustrate the operating principle of a reflective device with the use of different reflecting plates;

FIG. 10-b is a block diagram associated with a second processing unit;

FIG. 13 is a view explaining the representation of a cursor;

FIG. 14 is a view showing a sequence of translation procedures;

FIG. 15 is a view explaining data insertion;

FIG. 16 is a view explaining a copy mode;

DESCRIPTION OF THE PREFERRED EMBODIMENTS

Preferred embodiments of the present invention will be described referring to the accompanying drawings.
Embodiment 1

Figure 1:
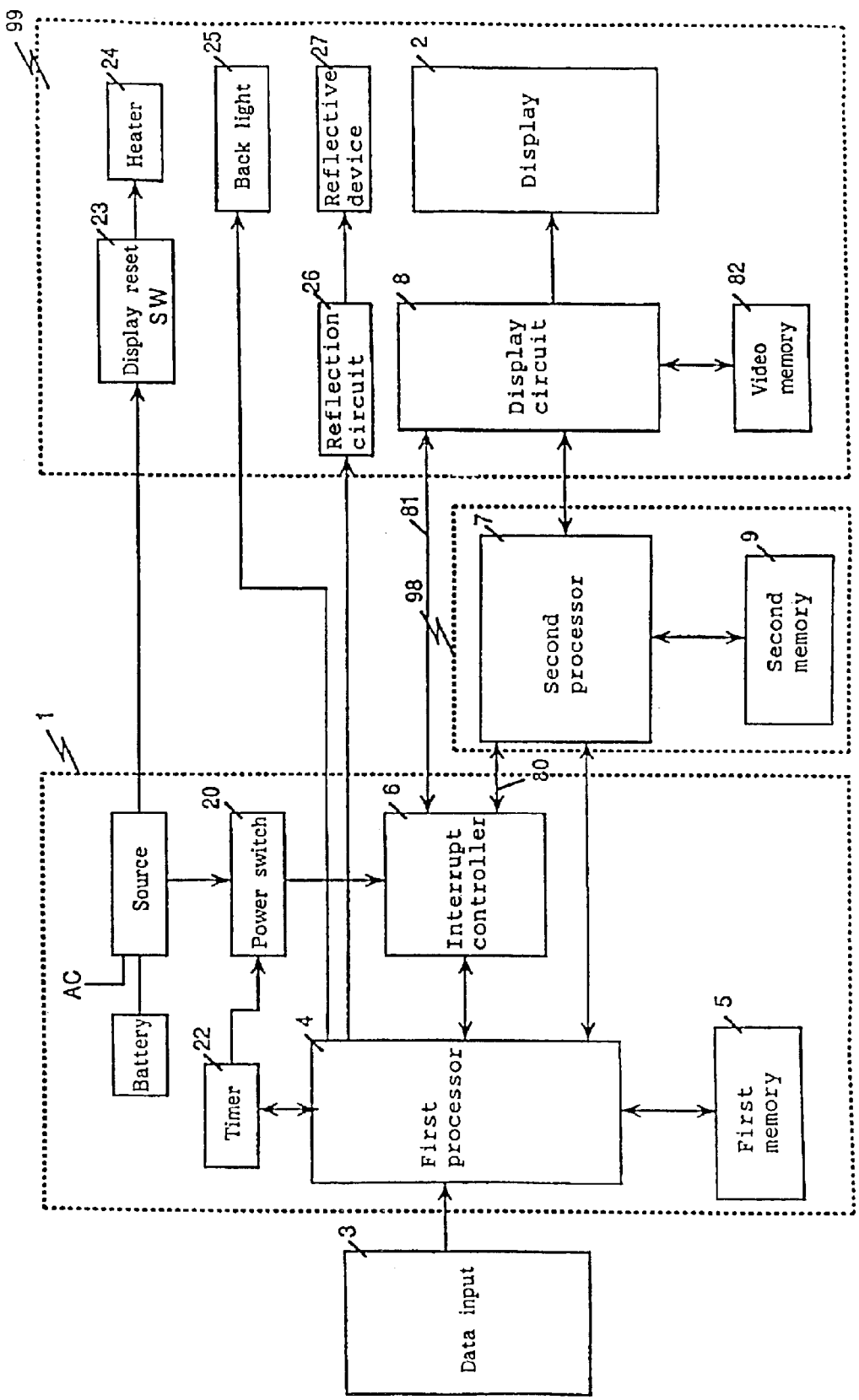
FIG. 1 is a block diagram of a data processing apparatus showing a first embodiment of the present invention.

FIG. 1 is a block diagram of a data processing apparatus showing a first embodiment of the present invention.

The data processing apparatus comprises a data input unit 3, a first processing block 1, a second processing block 98, and a display block 99.

In operation, a data input which is fed to the data input unit 3 of the data processing apparatus by means of key entry with a key-board or communications interface is transferred to the first processing block 1 in which a first processor 4 examines which key in key entry is pressed or what sorts of data are input from the outside and determines the subsequent procedure according to the information from a first memory 5.

Figure 2:
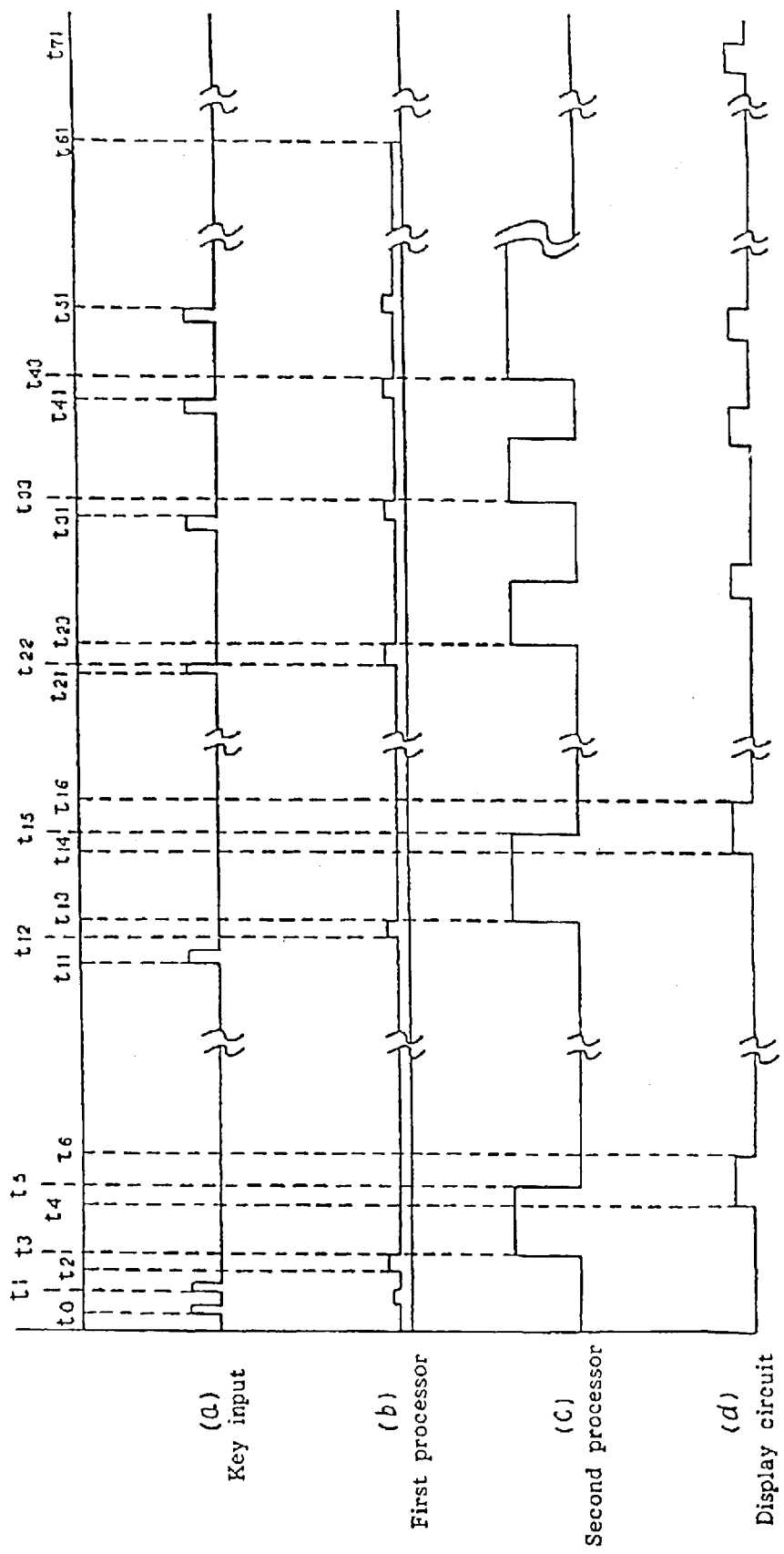
FIG. 2 is a timing chart.

If no input is supplied to the data input unit 3 throughout a given period of time as shown in FIG. 2-a and also, the action of a second processor 7 has been completed, the feeding of clock signals to the second processor 7 and a display circuit 8 is halted by an interruption controller 6 and/or a process of energy saving is systematically executed.

The energy saving process will now be described referring to FIG. 2.

As shown in FIG. 2-a, a data input entered at t1 using an n-th key of the key-board is transferred from the data input unit 3 to the first processor 4.

The first processor 4 when examining the data input and determining that further processing at the second processor 7 is needed delivers a start instruction via the interruption controller 6 and a start instruction line 80 to the second processor 7 which thus commences receiving the data input from the first processor 4. The second processor 7 starts processing the data input when t=t3 as shown in FIG. 2-c and upon finishing, sends an end signal to the first processor 4. In turn, either the first processor 4 or the interruption controller 6 delivers a stop instruction to the second processor 4 via the startup instruction line 80. Accordingly, the second processor 4 transfers finally processed data from its RAM memory or register to the second memory for temporary storage and then, stops processing action when t=t5 as shown in FIG. 2-c or enters into an energy saving mode where a consuming power is sharply attenuated. After t5 where the actuation of the second processor 7 is ceased, the data remains held in the second memory 9 due to its nonvolatile properties or due to the action of a backup battery. If display change is needed, the second processor 4 sends a display change signal to the first processor 4. The first processor 4 then delivers a display start instruction via a display start instruction line 81 to the display circuit 8 for starting actuation. When t=t4 as shown in FIG. 2-d, the command signal is transmitted to the display circuit 8 which in turn retrieves the data of a previous display text from a video memory 82 or the second memory 9 and displays a new image corresponding to the display change signal and data from the second processor 7. When t=t6, the display circuit 8 sends its own instruction or an end signal via the interruption controller 6 to the first processor 4 and upon receiving an instruction from the first processor 4, stops or diminishes clock generation to enter a display energy saving mode. Thereafter, the power consumption of the display circuit 8 will largely be declined as illustrated after t6 in FIG. 2-d.

Figure 3:
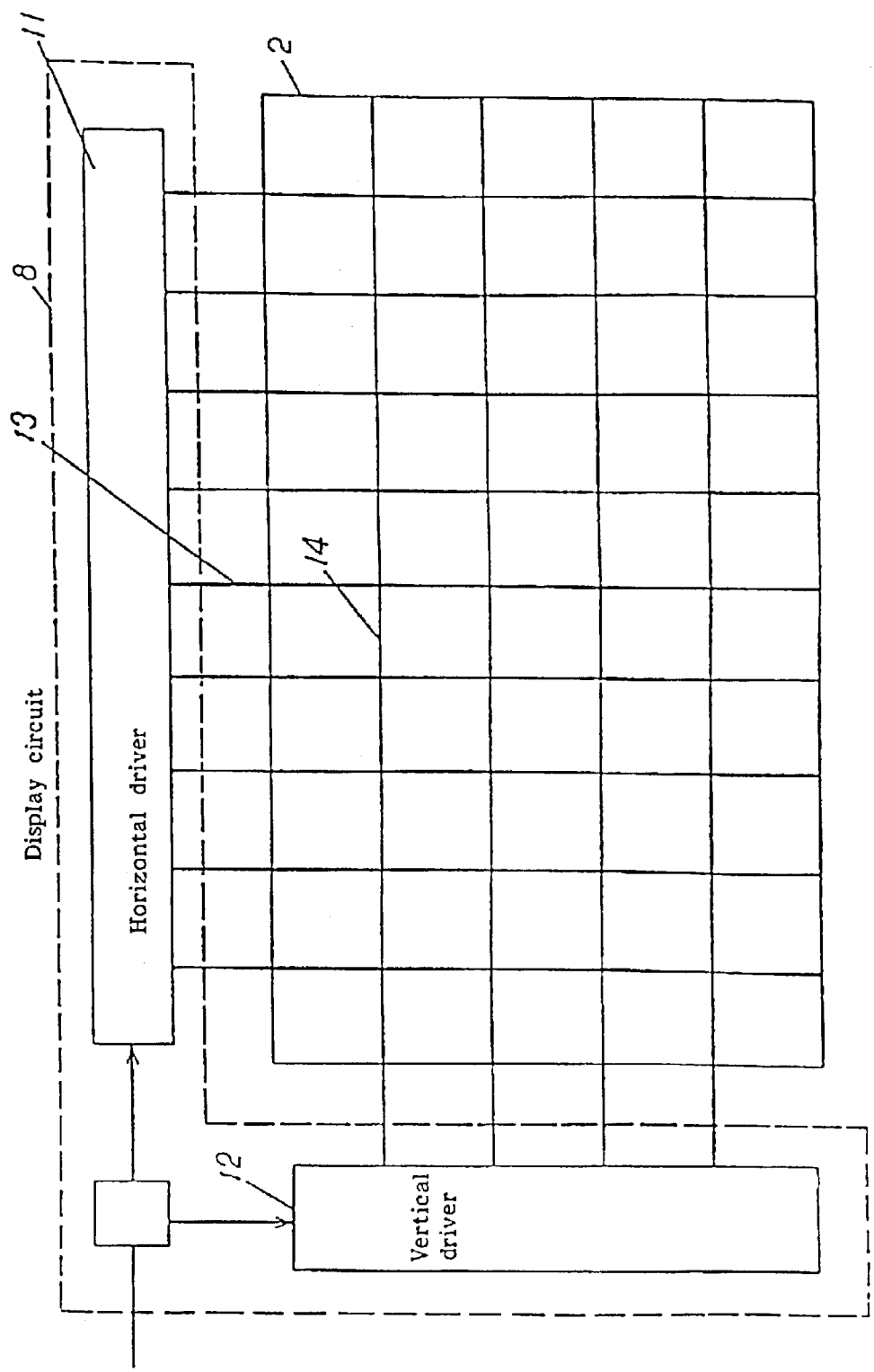
FIG. 3 is a view showing the arrangement of a display unit.
Figure 4C:
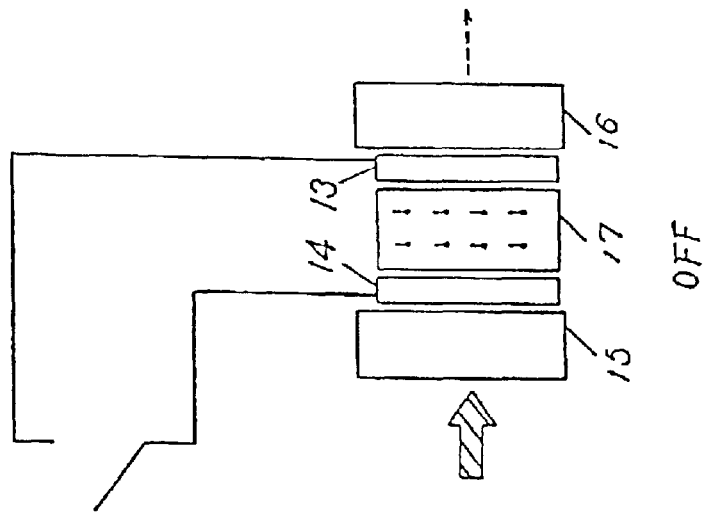
FIG. 4 is a cross sectional view explaining the operating principle of the display unit.
Figure 4B:
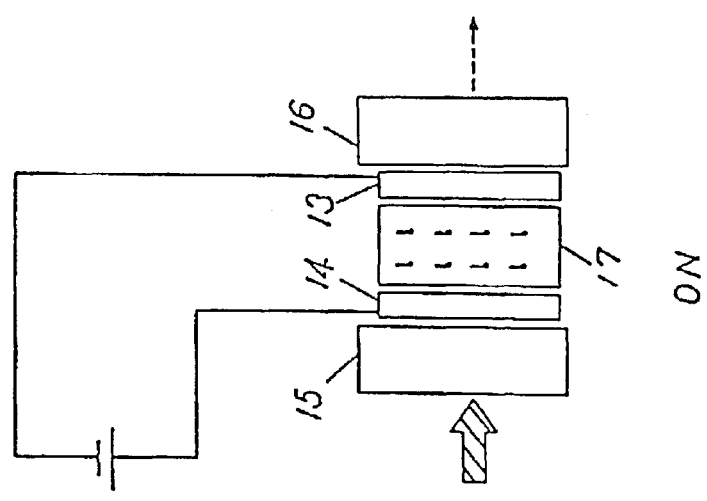
Figure 4A:
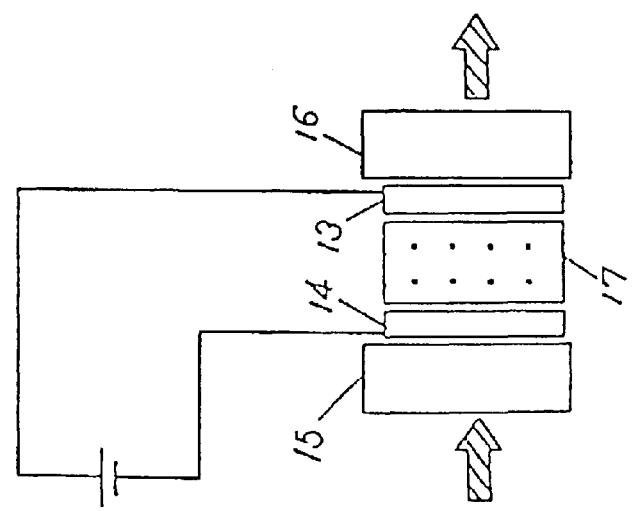

After t6, the display circuit 8 stays fully or nearly inactivated but a display 2 which is substantially consisted of memory retainable devices, e.g. ferroelectric liquid crystal devices, continues to hold the display image. The arrangement of the display 2 will now be described. The display 2, e.g. a simple matrix type liquid crystal display, contains a matrix of electrodes in which horizontal drive lines 13 and vertical drive lines 14 coupled to a horizontal driver 11 and a vertical driver 12 respectively intersect each other, as best shown in FIG. 3. FIG. 4 illustrates a pixel of the display 2 in action with a voltage being applied.

In each pixel, a ferroelectric liquid crystal 17 is energized by the two, horizontal and vertical lines 13, 14 which serve as electrodes and are provided on glass plates 15 and 16 respectively.

More particularly, FIG. 4-a shows a state where light is transmitted through. When a signal is given, the ferroelectric liquid crystal 17 changes its crystalline orientation and acts as a polarizer in which an angle of polarization is altered, thus allowing the light to pass through.

When a voltage is applied in the reverse direction, the ferroelectric liquid crystal 17 causes the angle of polarization to turn 90 degrees and inhibits the passage of light with polarization effects, as shown in FIG. 4-*b*. The ferroelectric liquid crystal 17 also has a memory retainable effect as being capable of remaining unchanged in the crystalline orientation after the supply of voltage is stopped, as shown in FIG. 4-*c*. Accordingly, throughout a duration from t=t6 to t=t14, explained later, the display remains intact without any operation of the display circuit 8. While the energy saving mode is involved after t6, both the data input unit 3 and the first processor 4 are only in action.

The first processor 4 performs only conversion of key entry to letter code or the like. In general, the key entry is conducted by a human operator and executed some tens times in a second at best. The speed of data entry by a human operator is 100 times or more slower than the processing speed of any microcomputer. Hence, the processing speed of the first processor 4 may be as low as that of a known hand calculator and the power consumption will be decreased to hundredths or thousandths of one watt as compared with that of a main CPU in a desktop computer. As shown in FIG. 2-*b*, the first processor 4 continues operating while a power switch 20 of the data processing unit 1 is closed. However, it consumes a lesser amount of energy and thus, the power consumption of the apparatus will be low.

When n+1-th key entry is made at t11, the first processor 4 examines the data of the entry at t12 and if necessary, delivers a start instruction via the interruption controller 6 or directly to the second processor 7 for actuation. Upon receiving the start instruction, the second processor 7 starts processing again with the use of clock signals so that the data stored in the second memory 9, i.e. data at a previous stop when t=t5, such as memory data, register information, or display data, is read out and the CPU environment when t=t5 can fully be restored. When t=t13, the data in the first processor 4 is transferred to the second processor 7 for reprocessing. The second processor 7 is arranged to operate at high speeds and its power consumption is as high as that of a desk-top computer. If the second processor 7 is continuously activated, the life of batteries will be shortened as well as in a known note computer. The present invention however provides a series of energy saving mode actions during the operation, whereby the energy consumption will be minimized.

The energy saving mode is advantageous. For example, the duration required for processing the data of a word processing software is commonly less than 1 ms while the key entry by a human operator takes several tens of milliseconds at maximum. Hence, although the peak of energy consumption during a period from t13 to t15 is fairly high in the second processor 7 as shown in FIG. 2-*c*, the average is not more than a tenth or a hundredth of the peak value. It is now understood that the energy saving mode allows lower power consumption.

When t=t14, the second processor 7 sends a desired portion of the display data to the display 2. Before t14, the display 2 continues to display the text altered at t6 due to the memory effects of the ferroelectric liquid crystal 17 while the display circuit 8 remains inactivated. The desired data given through the key entry at t11 is written at t14 for regional replacement. The replacement of one to several lines of display text is executed by means of voltage application to corresponding numbers of the horizontal and vertical drive lines 13 and 14. This procedure requires a shorter period of processing time and thus, consumes a lesser amount of energy as compared with replacement of the entire display text.

The second processor 7 then stops operation when t=t15 and enters into the energy saving mode again as shown in FIG. 2-*c*.

At the moment when the operation of the second processor 7 has been finished before t15 or when a stop instruction from the first processor 4 is received, the second processor 7 saves the latest data in the second memory 9.

When t=t14, the second processor 7 stops operation or diminishes an operating speed and enters into the energy saving mode.

When the input data is fed at short intervals, e.g. at t21, t31, t41, and t51, through a series of key entry actions or from a communications port, the second processor 7 shifts to the energy saving mode at t23, t33, and t43 as shown in FIG. 2-*c*. If the first processor 4 detects that the interval between data inputs is shorter than a predetermined time, it delivers an energy saving mode stop instruction to the second processor 7 which thus remains activated without forced de-energization and no longer enters into the energy saving mode. The energy saving mode is called back only when the interval between two data inputs becomes sufficiently long.

Also, when the first processor 4 detects that the key entry is absent during a given length of time, it actuates to disconnect the power supply to primary components including the first processor 4 for shift to a power supply stop mode. The memory data is being saved by the back-up battery while the power supply is fully disconnected.

Figure 5B:
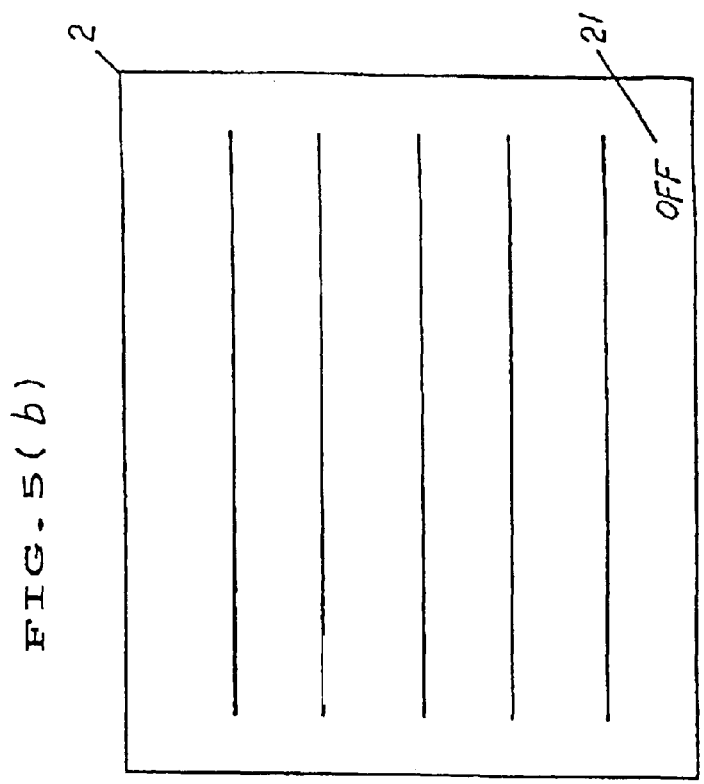
FIGS. 5(a) and 5(b) are views showing displayed images on the display unit.
Figure 5A:
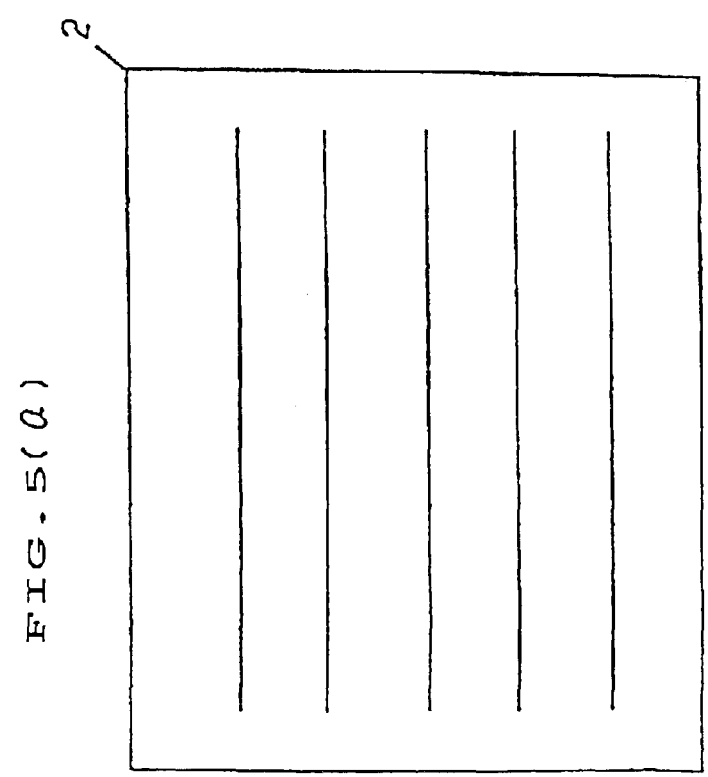

Before disconnection of the power supply, the first processor 4 however sends a power supply stop display instruction directly or via the second processor 7 to the display circuit 8 for display of an "OFF" sign 21 shown in FIG. 5-*b* and then, enters into the power supply stop mode. The OFF sign 21 remains displayed due to the memory effects of the display 2 after the power supply is disconnected, thus allowing the operator to distinguish the power supply stop mode from the energy saving mode.

In the energy saving mode, the operation can be started again by key entry action and thus, the operator will perceive no interruption in the processing action.

In the power supply stop mode, the OFF sign 21 is displayed and the operator can restart the operation in succession with the previous data retrieved from the second memory 9 by the second processor 9 when the power switch 20 is turned on. This procedure is similar to that in the conventional "resume" mode.

The foregoing operation will now be described in more detail referring to a flow chart of FIG. 6. When the power switch 20 is turned on at Step 101, the first processor 4 starts activating at Step 102. The input data given by key entry is transferred from the data input unit 3 to the first processor 4 at Step 103. At Step 104, it is examined whether the duration of no-data entry lasts for a predetermined time or not. If the no-data entry duration t is greater than the predetermined time, the procedure moves to Step 105 where the actuation of the second processor 7 is examined. If the second processor 7 is in action, the procedure moves back to Step 103. If not, the entire apparatus is de-energized, at Step 106, and stops actuating at Step 107 before restarting with Step 101 where the power supply switch 20 is closed.

If the no-data entry duration t is greater than the predetermined time, but is as short as a few minutes, the procedure is shifted from Step 104 to Step 108. When the processing frequency in the first and second processors 4 and 7 is low, the procedure moves from Step 108 to Step 109 where a back light is turned off for energy saving.

If the no-data entry duration t is not greater than the predetermined time, the operation in the first processor 4 is prosecuted at Step 110. Also, it is examined at Step 110*a* whether the data of text is kept displayed throughout a considerable length of time or not. If too long, refreshing action of the data display is executed at Step 110*b* for prevention of an image burn on the screen. At Step 110*c*, the processing frequency in the second processor 7 is examined and if it is high, the second processor 7 is kept in action at Step 110*d*. If the processing frequency is low, the procedure moves to Step 111. When it is determined at Step 111 that no further processing in the second processor 7 is needed, the procedure returns to Step 103.

When further processing in the second processor 7 is required, the procedure moves from Step 111 to Step 112*a* where the actuation of the second processor 7 is examined. If the second processor 7 is not in action, a start instruction is fed at Step 112*b* to the second processor 7 which is in turn activated at Step 113 by the first processor 4 and the interruption controller 6. The second processor 7 then starts processing action at Step 114. If it is determined at Step 115 that a change in the text of display is needed, the procedure moves to Step 116*a* where a display change instruction is supplied to both the interruption controller 6 and the first processor 4. Then, the interruption controller 6 delivers a display energizing instruction to the display block 99 at Step 116*b*. The display circuit 8 is activated at Step 116*c* and the display change on the display 2 including the replacement of a regional data with a desired data is carried out at Step 117. After the display change is checked at Step 118, a display change completion signal is sent to the first processor 4 at Step 117*a*. When the display change completion signal is accepted at Step 117*b*, the display 2 is turned off at Step 119.

If no change in the display text is needed, the procedure moves from Step 115 to Step 120 where the completion of the processing in the second processor 7 is examined. If yes, a processing completion signal is released at Step 120*a*. As a result, the second processor 7 stops operation at Step 121 upon receiving a stop signal produced at Step 120*b* and the procedure returns back to Step 103.

Figure 7C:
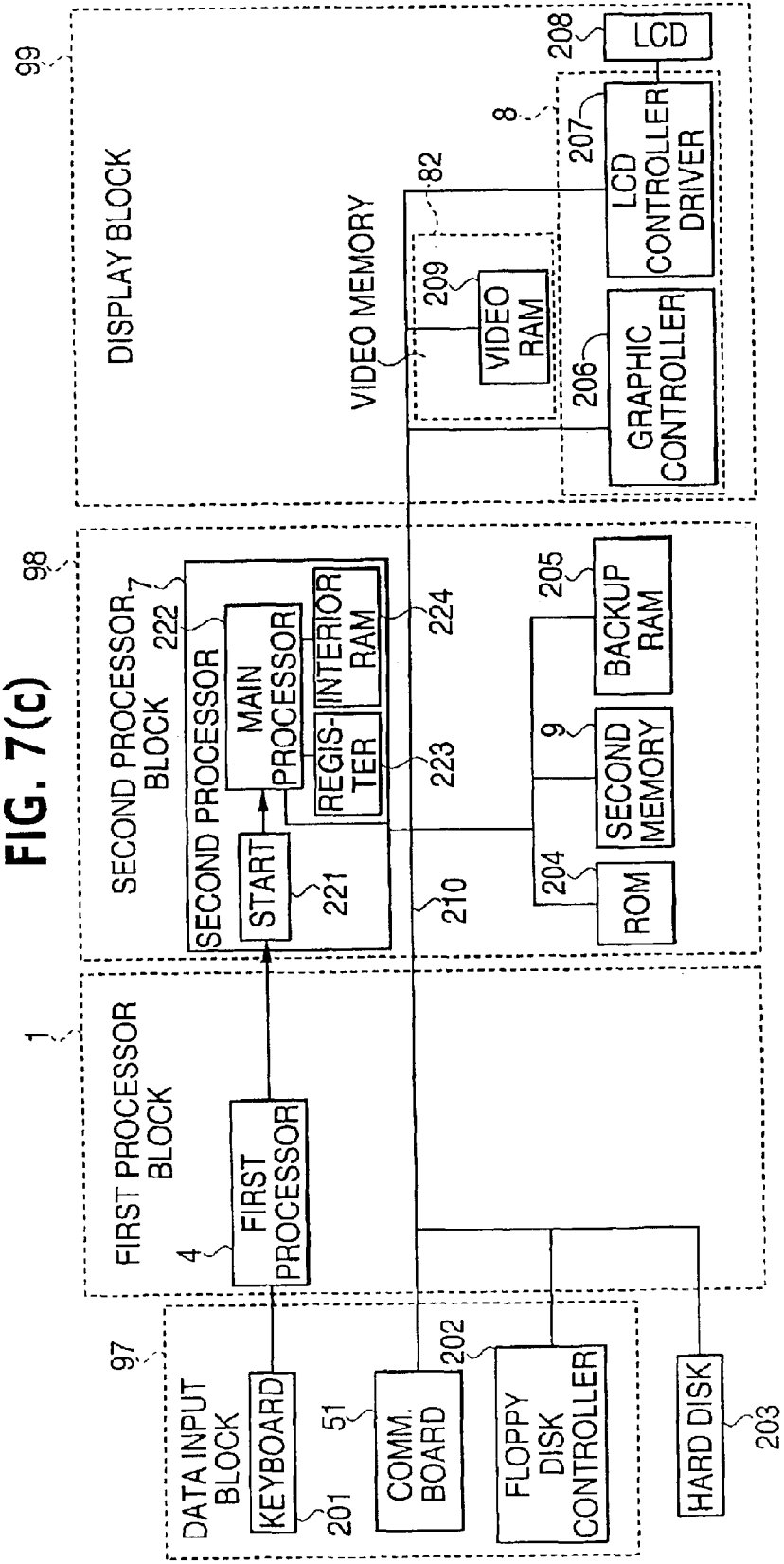
FIG. 7-a is a block diagram showing an arrangement of components.
Figure 7D:
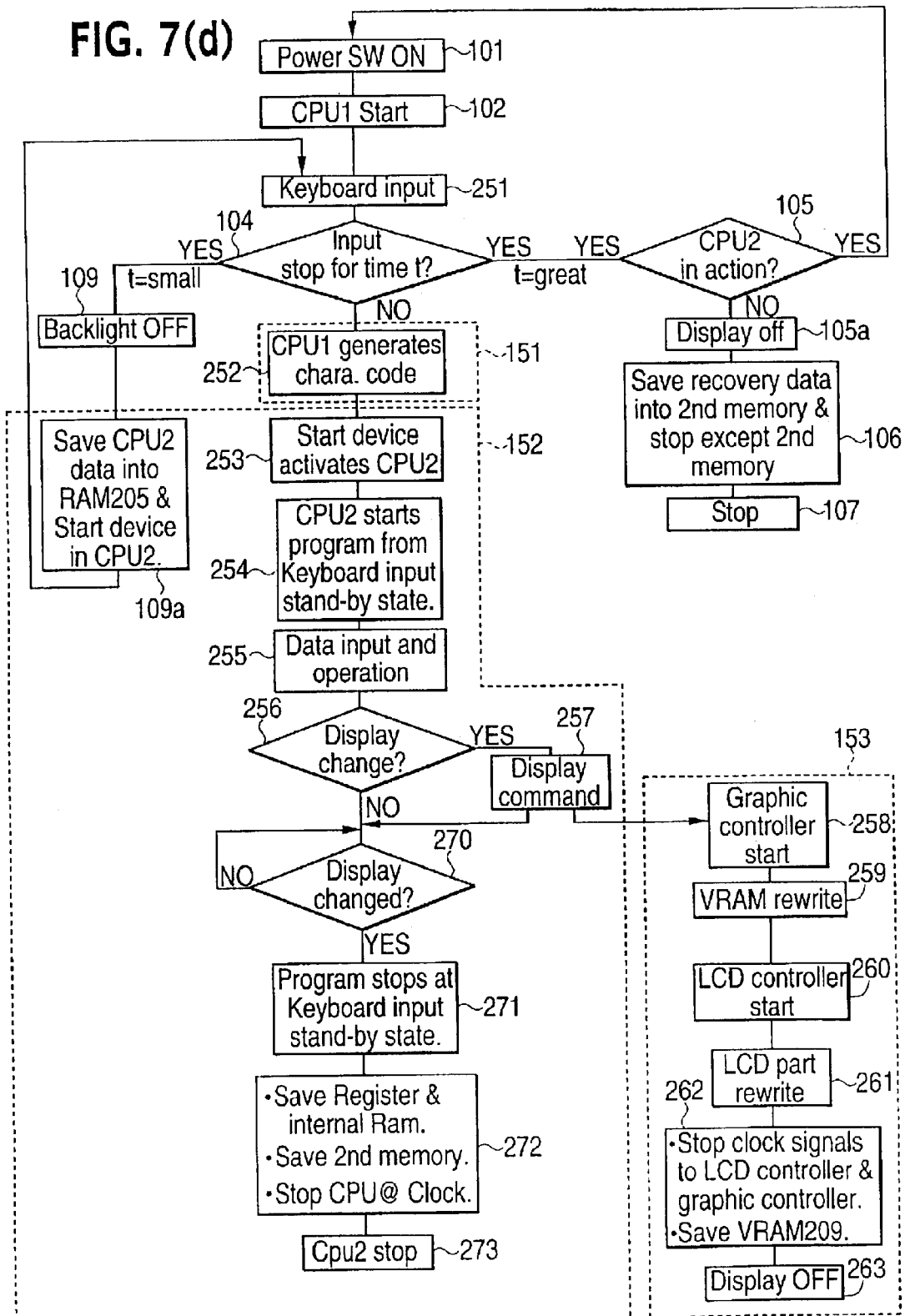
Figure 8B:
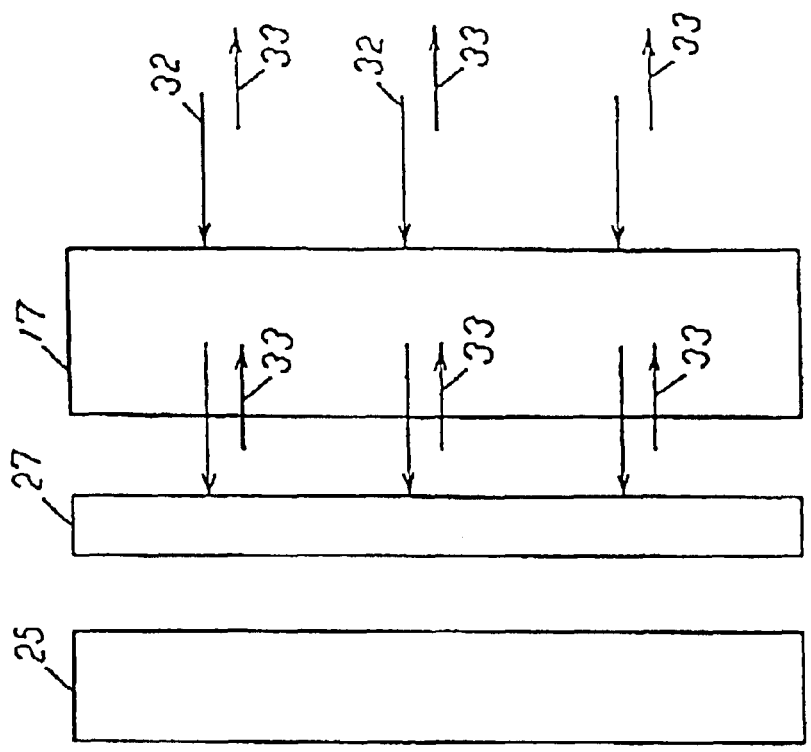
Figure 8A:
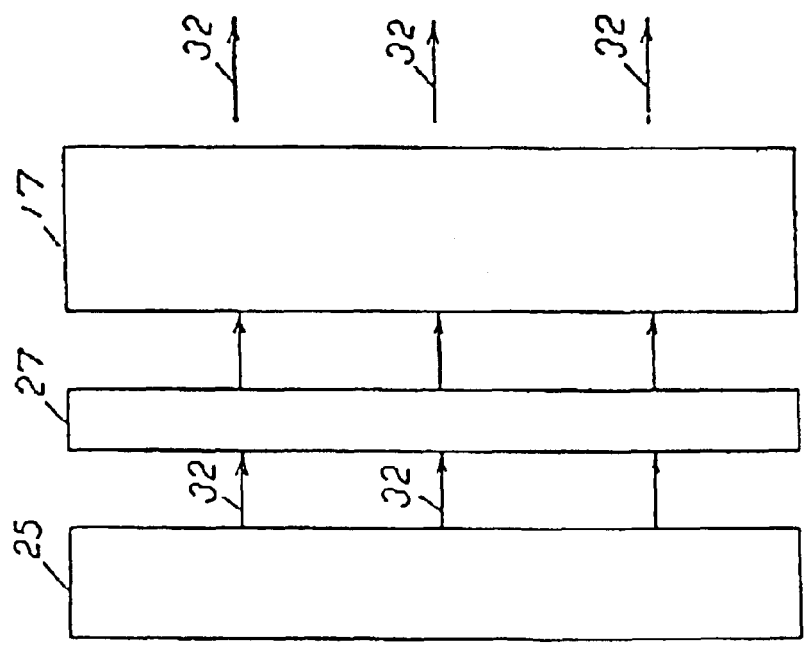
Figure 8D:
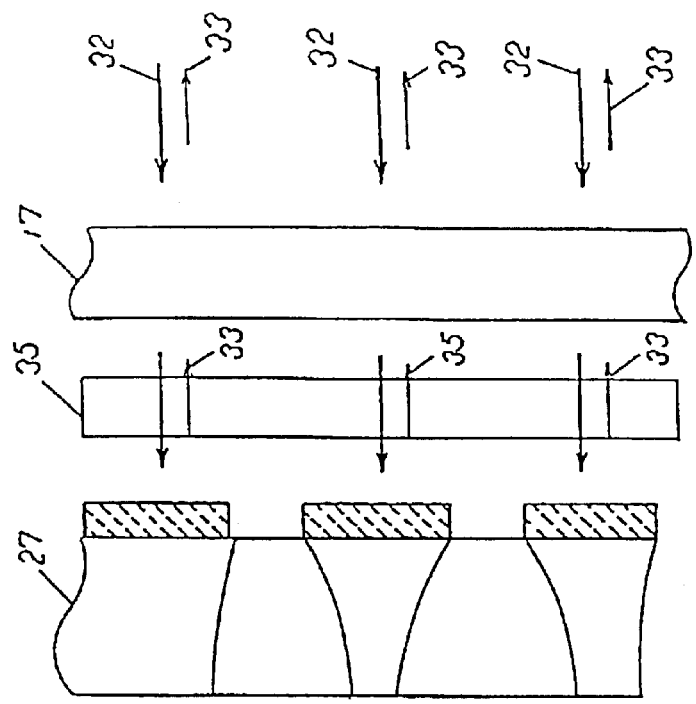
Figure 8C:
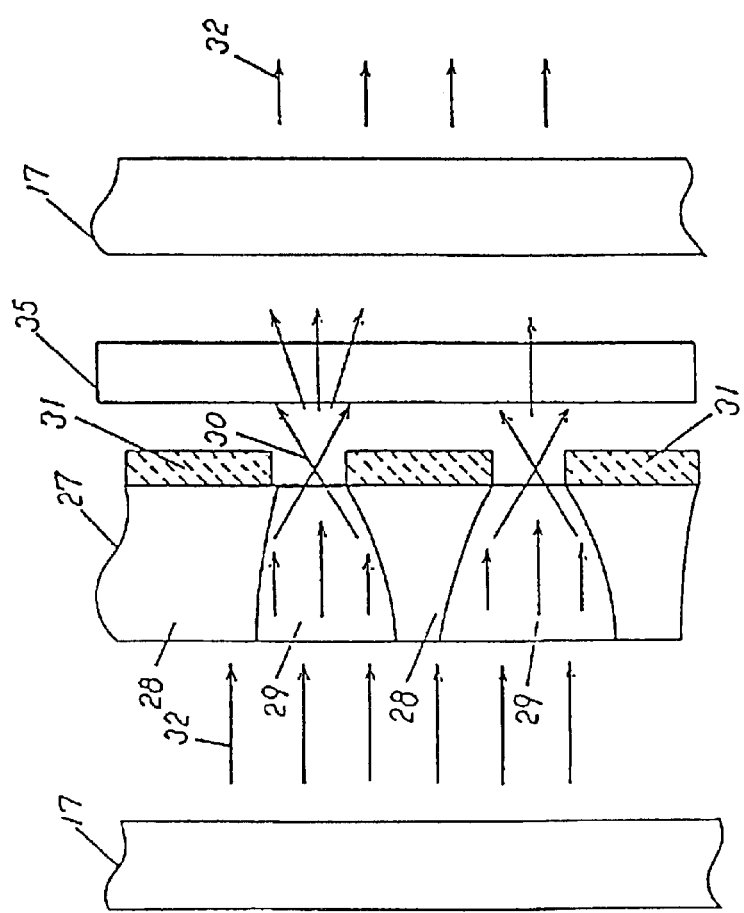

FIGS. 7-*a* and 7-*b* are block diagrams of a note-size computer according to the first embodiment of the present invention.

As shown in FIG. 7-*a*, a data input block 97 comprises a keyboard 201, a communication port 51 with RS232C, and a floppy disk controller 202. Also, a hard disk unit 203 is provided separately. A first processing block 1 is mainly consisted of a first processor 4. A second processing block 98 contains a second processor 7 which is a CPU arranged for shift to and back from the energy saving mode upon stopping and feeding of a clock signal respectively and is coupled to a bus line 210. Also, a ROM 204 for start action, a second memory 9 of DRAM, and a backup RAM 205 which is an SRAM for storage of individual data of returning from the resume mode are coupled to the bus line 210. Both ends of the bus line 210 are connected to the first processor 4 and a display block 99 respectively. The display block 99 has a graphic controller 206 and a liquid crystal controller driver 207 arranged in a display circuit. There are also provided a video RAM 209 and a liquid crystal display 208. For energy saving operation, corresponding components only in the arrangement are activated while the remaining components are de-energized. This energy saving technique is illustrated in more detail in Table 1. In general, input operation for e.g. word processing involves an intermittent action of keyboard entry. Hence, the power supply is connected to every component except the communications I/O unit. While a clock signal is fed to the first processing block 1, no clock signals are supplied to the second processing block 98 and the display block 99. Power is thus consumed only in the first processing block 1. If necessary, the second block 98 and/or the display block 99 are activated within a short period of time. If more frequent operations are needed, the second processing block 98 is kept activated for acceleration of processing speeds.

When the key entry is absent for a given time, the second processing block 98 is disconnected and simultaneously, its processing data is stored in a backup memory for retrieval in response to the next key entry.

FIG. 7-*b* is similar to FIG. 7-*a*, except that the first processor 4 having a lower clock frequency is used as a "monitor" for the total system and the processing will be executed by the second processor 7 having a higher clock frequency. The first processor 4 is adapted for operating an event processing method by which the second processor 7 is activated for processing action corresponding to data of the keyboard entry. The second processor 7 stops operation for the purpose of energy saving when the processing action is finished and remains inactivated until another key entry commences. The display block 99 starts operating in response to a display signal from the second processor 7 and stops automatically after completion of display. This procedure can be executed with a common operating system similar to any known operating system, thus ensuring high software compatibility. For example, MS-DOS is designed to run with the use of one complete CPU. Hence, the energy saving effect will hardly be expected during operation with conventional application software programs. It is then a good idea that a specific operating system and a corresponding word processing software which are installed in two CPUs are provided in addition to the conventional operating system. Accordingly, a word processing job can be performed using the specific software with the operating system of the present invention and thus, the power consumption will be reduced to less than a tenth or hundredth. Also, general purpose software programs can work with the conventional operating system-although the energy saving effect will be diminished. It would be understood that about 80% of the job on a note-size computer is word processing and the foregoing arrangement can contribute to the energy saving.

FIG. 7-*c* is a block diagram of another example according to the first embodiment and FIG. 7-*d* is a flow chart showing a procedure with the use of a conventional operating system such as MS-DOS. The second processor 7 is a CPU capable of holding data from its register and internal RAM during actuation of no clock or de-energization. When key entry is made at Step 251, a keyboard code signal from the keyboard 201 is transferred by the first processor 4 to a start device 221 which remains activated, at Step 252. At Step 253, the start device 221 delivers a clock signal to a main processor 222 which is de-energized. Both of the register 223 and the internal RAM 224 are coupled to a backup source and thus, start operating upon receipt of the clock signal. At Step 254, the main processor 222 starts the program which has been on stand-by for key entry. The program is then processed for e.g. word processing according to data of the key entry, at Step 255. At Step 257, a display instruction is released for replacement of display text if required at Step 256. At Step 258, the graphic controller 206 is activated. The data in the video RAM 209 is thus rewritten at Step 259. After the liquid crystal controller driver 207 is activated at Step 261, a desired change in the display text is made on the liquid crystal display 208 formed of ferroelectric liquid crystal. Then, the video RAM 209 is backup energized at Step 262 and the display block 99 is de-energized, at Step 263, thus entering into the energy saving mode. When the processing in the second processor 7 is completed at Step 270, the program stops and moves into a "keyboard entry stand-by" stage at Step 271. At Step 272, the data required for re-actuation of the register 223 and the internal RAM 234 is saved and the second memory 9 is backup energized before a clock in the CPU is stopped. Then, the second processor 7 stops operation, at Step 273, thus entering into the energy saving mode. As the start device 221 remains activated, the second processor 7 stays on stand-by for input through keyboard entry at Step 251 or from the communications port 5. As understood, the start device 221 only is kept activated in the second processing block 98. The CPU shown in FIG. 7-*c* provides backup of registers with its clock unactuated and ensures instant return to operation upon actuation of the clock. As a single unit of the CPU is commonly activated, a conventional operating system can be used with equal success. Also, existing software programs including word processing programs can be processed with less assignment and thus, private data stock will be permitted for optimum use. Consequently, it would be apparent that this method is eligible. In addition, the consumption of electric energy will be much decreased using a technique of direct control of the first processor 1 on display text change which will be described later with a second embodiment of the present invention. As understood, the resume mode allows most components to remain de-energized when no keyboard entry lasts for a long time.

As a ferroelectric liquid crystal material has a memory effect, permanent memory results known as protracted metastable phenomenon will appear when the same text is displayed for a longer time. For prevention of such phenomenon, a display change instruction is given to the first processor 4 and the power switch 20 upon detection with the timer 22 that the display duration exceeds a predetermined time in the energy saving mode or power supply stop mode. Accordingly, the display circuit 8 actuates the display 2 to change the whole or a part of the display text, whereby permanent memory drawbacks will be eliminated.

If it is happened that the persistence of such permanent memory effects allows no change in the display text on the display 2, the crystalline orientation of liquid crystal is realigned by heating up the display 2 with a heater 24 triggered by a display reset switch 23. Then, arbitrary change in the display text on the display 2 will be possible.

Energy saving can be promoted by stopping the clock in the second processor 7 during the energy saving mode. When more or full energy saving is wanted, the power supply to the second processor 7 or the display circuit 8 is disconnected by the interruption controller 6.

As understood, the power supply stop mode requires a minimum of power consumption for backup of the second memory 9.

As shown in FIG. 1, the back light 25 is turned off when the power source is a battery and a reflective device 27 is activated by a reflection circuit 26 for display with a reflection mode.

The reflective device 27 is composed of a film of ferroelectric liquid crystal which provides a transparent mode for transmission of light, as shown in FIG. 8-*a*, and an opaque mode for reflection as shown in FIG. 8-*b*, for alternative action. Incoming light 32 is reflected on the reflective device 27 and runs back as reflected light 33. At this time, polarization is also effected by the polarizers in the display 2 and the reflective device 27, whereby the number of components will be reduced. Also, a film-form electrochromic display device may be used for providing a transmission mode and a white diffusion screen mode in which it appears like a sheet of white paper.

The reflective device 27 may be of fixed type, as shown in FIGS. 8-*c* and 8-*d*, comprising a light transmitting layer composed of low refraction transmitting regions 28 and high refraction transmitting regions 29 and a reflecting layer 31 having apertures 30 therein.

As shown in FIG. 8-*c*, light emitted from the back light 25 enters the high refraction transmitting regions 29 where it is fully reflected on the interface between the high and low refraction transmitting regions 29, 28 and passes across the apertures 31 to a polarizer plate 35. The polarized light is then transmitted to a liquid crystal layer 17 for producing optical display with outwardly emitted light.

During the reflection mode in battery operation, outside light 32 passes the liquid crystal layer 17 and is reflected by the reflecting layer 31 formed by vapor deposition of aluminum and reflected light 33 runs across the liquid crystal layer 17 again for providing optical display.

The reflective device 27 requires no external drive circuit, thus contributing to the simple arrangement of a total system. It is known that such a combination of high and low refraction transmitting regions is easily fabricated by a fused salt immersion method which is commonly used for making refraction distributed lenses.

Although such a transmission/reflection combination type liquid crystal display is disadvantageous in the quality of a display image as compared with a transmission or reflection speciality type liquid crystal display, the foregoing switching between transmission and reflection allows display of as good an image as of the speciality type display in both the transmission and reflection modes. This technique is thus suited to two-source, battery and AC application.

When the external power source is connected, the back light 25 is lit upon receiving an instruction from the first processor 4 which also delivers a transmission instruction to the reflection circuit 26 and thus, the reflective device 27 becomes transparent simultaneously. Accordingly, transmitting light can illuminate the display as shown in FIG. 8-*a*.

When the battery is connected, the first processor 4 delivers a reflection signal to the reflection circuit 26 and the reflective device 27 becomes opaque to cause reflection and diffusion. As a result, the display is made by reflected outside light as shown in FIG. 8-*b* while an amount of electric energy required for actuation of the back light 25 is saved.

Also, the same result as shown in FIGS. 8-*c* and 8-*d* may be provided with the use of a transmitting reflective plate 34 which is formed of a metal plate, e.g. of aluminum, having a multiplicity of tapered round apertures therein, as illustrated in FIGS. 8-*e* and 8-*f*.

As set forth above, the CPU in this arrangement provides intermittent actuation in response to the intermittent key entry and the average power consumption of the apparatus will be declined to an appreciable rate.

Also, the text remains on display during the operation and thus, the operator can perceive no sign of abnormality when the processing unit is inactivated. More particularly, a great degree of energy saving will be ensured without affecting the operability.

More particularly, each key entry action takes several tens of milliseconds while the average of CPU processing durations in word processing is about tens to hundreds of microseconds. Hence, the CPU is activated 1/100 to 1/1000 of the key entry action time for accomplishing the task and its energy consumption will thus be reduced in proportion. However, while the energy consumption of the CPU is reduced to 1/1000, 1/10 to 1/20 of the overall consumption remains intact because the display unit consumes about 10 to 20%, namely 0.5 to 1 W, of the entire power requirement. According to the present invention, the display unit employs a memory effect display device provided with e.g. ferroelectric liquid crystal and thus, its power consumption will be minimized through intermittent activation as well as the CPU.

As the result, the overall power consumption during mainly key entry operation for e.g. word processing will be reduced to 1/100 to 1/1000.

Embodiment 2

Figure 9:
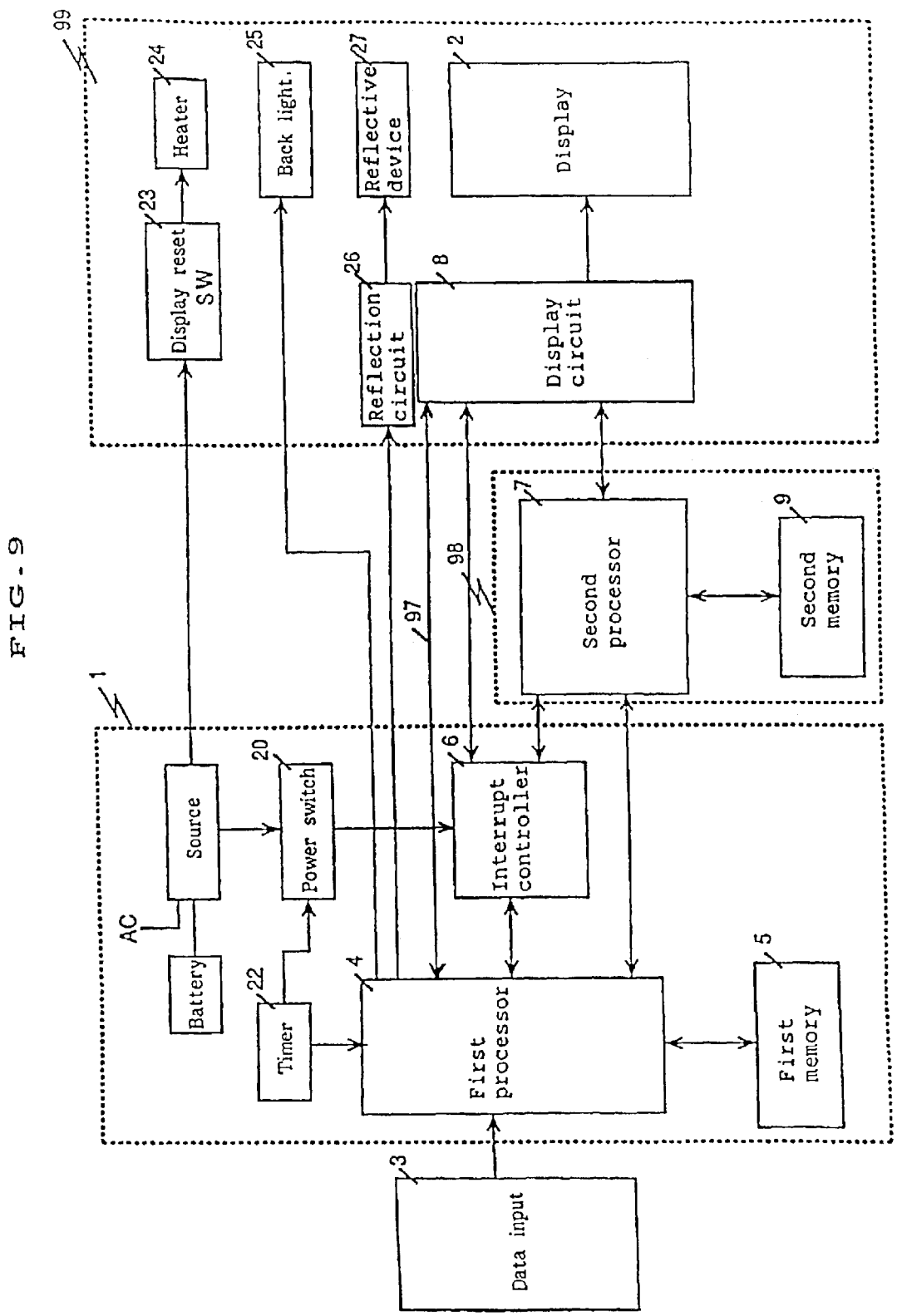
FIG. 9 is a block diagram showing a second embodiment of the present invention.

FIG. 9 is a block diagram showing a second embodiment of the present invention.

In the second embodiment, the first processor 4 is improved in the operational capability and the second processor 7 of which energy requirement is relatively great is reduced in the frequency of actuation so that energy saving can be encouraged.

As shown in FIG. 9, the arrangement of the second embodiment is distinguished from that of the first embodiment by having a signal line 97 for transmission of a display instruction signal from the first processing block 1 to the display block 99. In operation, the first processor 4 of the first processing block 1 delivers a display change signal to the display circuit 8 of the display block 99 for change of the display text on the display 2. As understood, the second processor 7 delivers such a display change signal to the display circuit 8 according to the first embodiment.

Figure 10A:
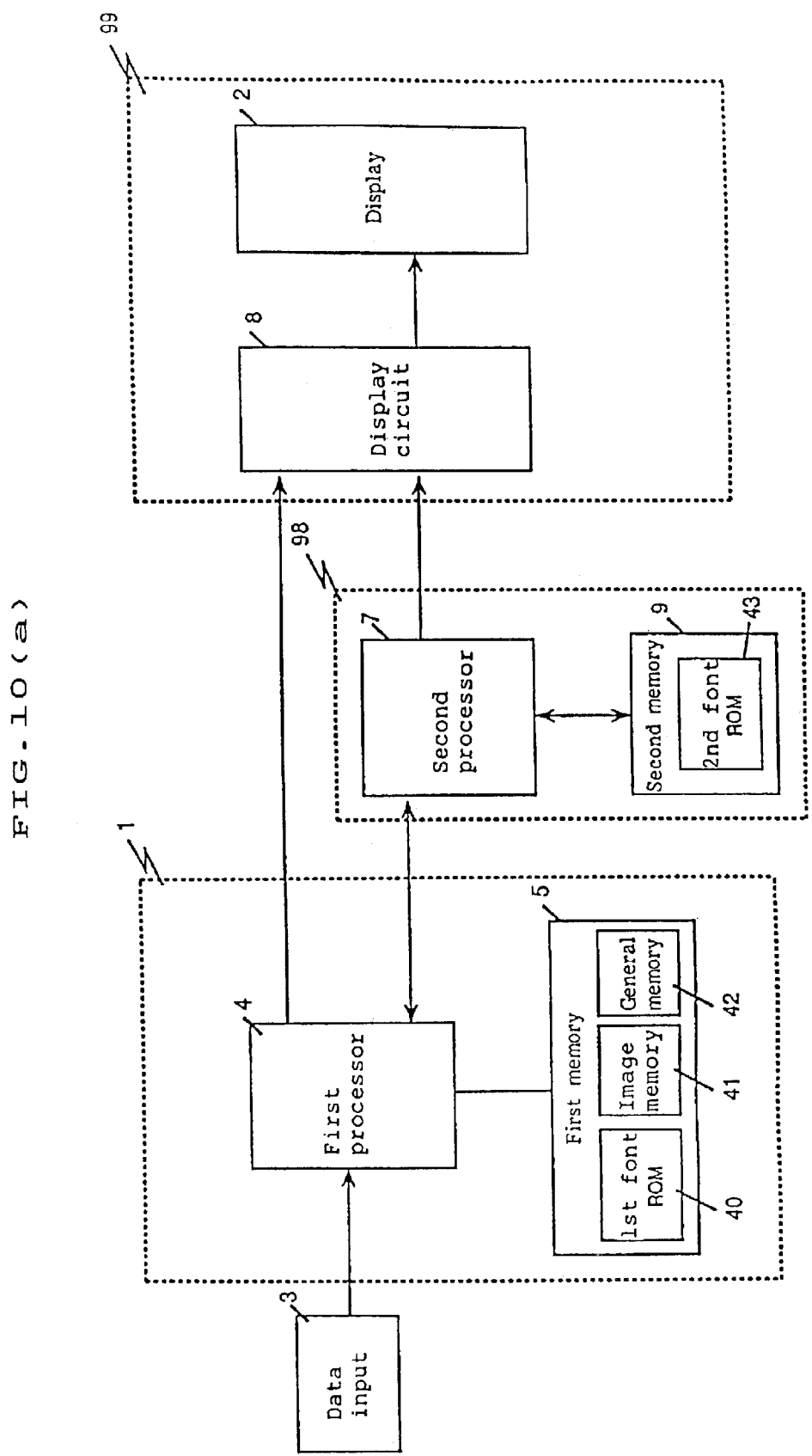
FIG. 10-a is a block diagram associated with a first processing unit.

FIG. 10-a is a block diagram showing in more detail the connection of the first processor 4, in which the first memory 5 comprises a first font ROM 40 for storage of dot patterns of alphabet and Japanese character fonts or the like in a ROM, an image memory 41, and a general memory 42.

Figure 10B:
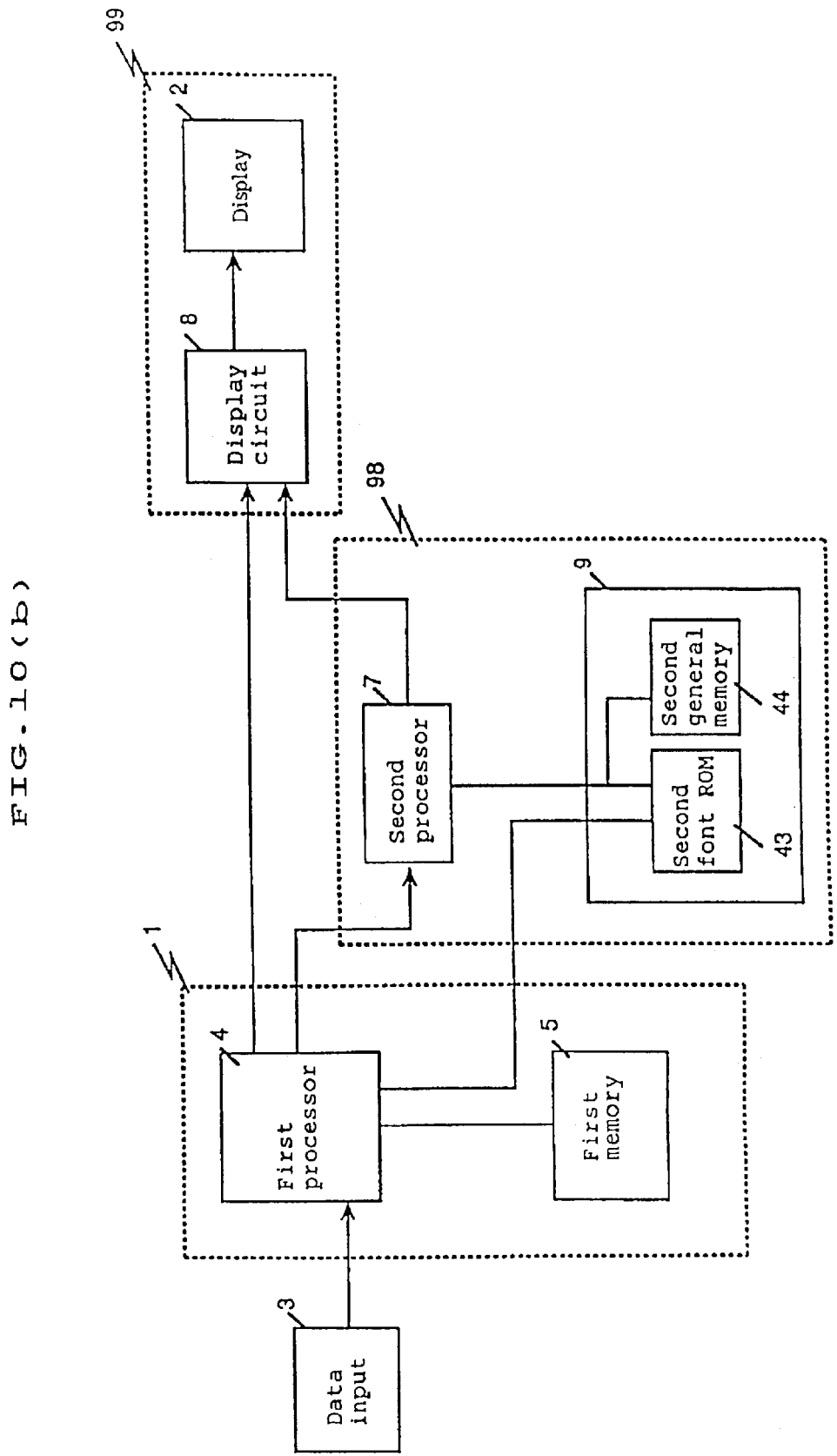

As shown in FIG. 10b, the second memory 9 may contain a second font ROM 43 which serves as a font memory.

In operation, a series of simple actions for display text change can be executed using the first processor 4. Character codes are produced in response to the key entry and font patterns corresponding to the character codes are read from the first 40 or second font memory 43 for display on the display 2 after passing the display circuit 8. The second memory 9 may also contain a second general memory 44.

Figure 11A:
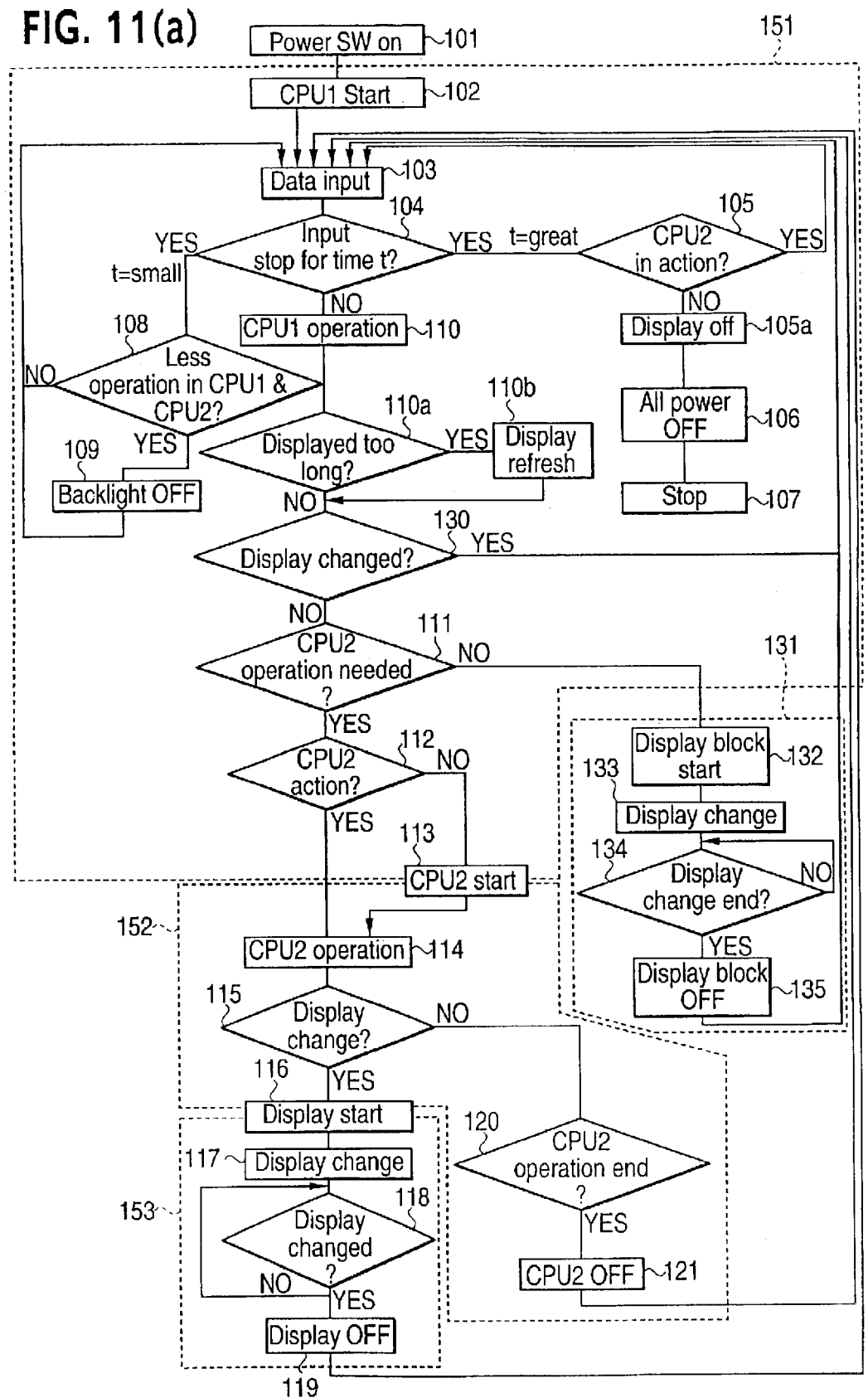
FIGS. 11-a and 11-b are flow charts.

During input of a series of data characters which requires no large scale of processing, the first processor 4 having less energy requirement is actuated for operation of the display text change. If large scale of processing is needed, the second processor 7 is then utilized. Accordingly, the frequency of actuation of the second processor 7 is minimized and energy saving will be guaranteed. Also, as shown in FIG. 11, the memory size of the first memory 5 can be decreased because of retrieval of font patterns from the second font ROM 43 of the second memory 9.

The operation according to the second embodiment will now be described in more detail referring to flow charts of FIGS. 11-a and 11-b. FIG. 11-a is substantially similar to FIG. 6 which shows a flow chart in the first embodiment.

A difference is that as the first processor 4 directly actuates the display circuit 8, a step 130 and a display flow chart 131 are added. When the first processor 4 judges that the display is to be changed in Step 130 and that a desired data for replacement in the display text is simple enough to be processed by the first processor 4 at Step 111, the procedure moves to the display flow chart 131. The display flow chart 131 will now be described briefly. It starts with Step 132 where the display block 99 is activated. At Step 133, the display text is changed and the change is examined at Step 133. After the confirmation of the completion of the text change at Step 134, the display block 99 is de-energized at Step 135 and the procedure returns back to Step 103 for stand-by for succeeding data input. FIG. 11-b illustrates the step 133 in more detail. After the display block 99 is activated, at Step 132, by a start instruction from the first processing block 1, the movement of a cursor with no restriction is examined at Step 140. If yes, data input throughout the cursor movement is executed at Step 141. If not, it is then examined whether the desired input area on the display 2 is occupied by existing data or not at Step 142. This procedure can be carried out by reading the data in the image memory 41 with the first processor 4. If no, partial text replacement with desired data is executed at Step 143. If yes, the procedure moves to Step 144 where the existing data in the input area of the display block 99 is checked using the image memory 41 and examined whether it is necessarily associated or not with the desired data to be input. If no, overwriting of the desired data is executed at Step 143. If yes, the existing data is retrieved from the image memory 41 or read from the second font ROM 9 and coupled with the desired data for composition, at Step 145. At Step 146, it is examined whether a black/white inversion mode is involved or not. If yes, the data is displayed in reverse color at Step 147. If no, the text change with the composite data is carried out at Step 148. Then, the completion of the text change is confirmed at Step 134 and the display block 99 is turned off at Step 99.

Figure 12:
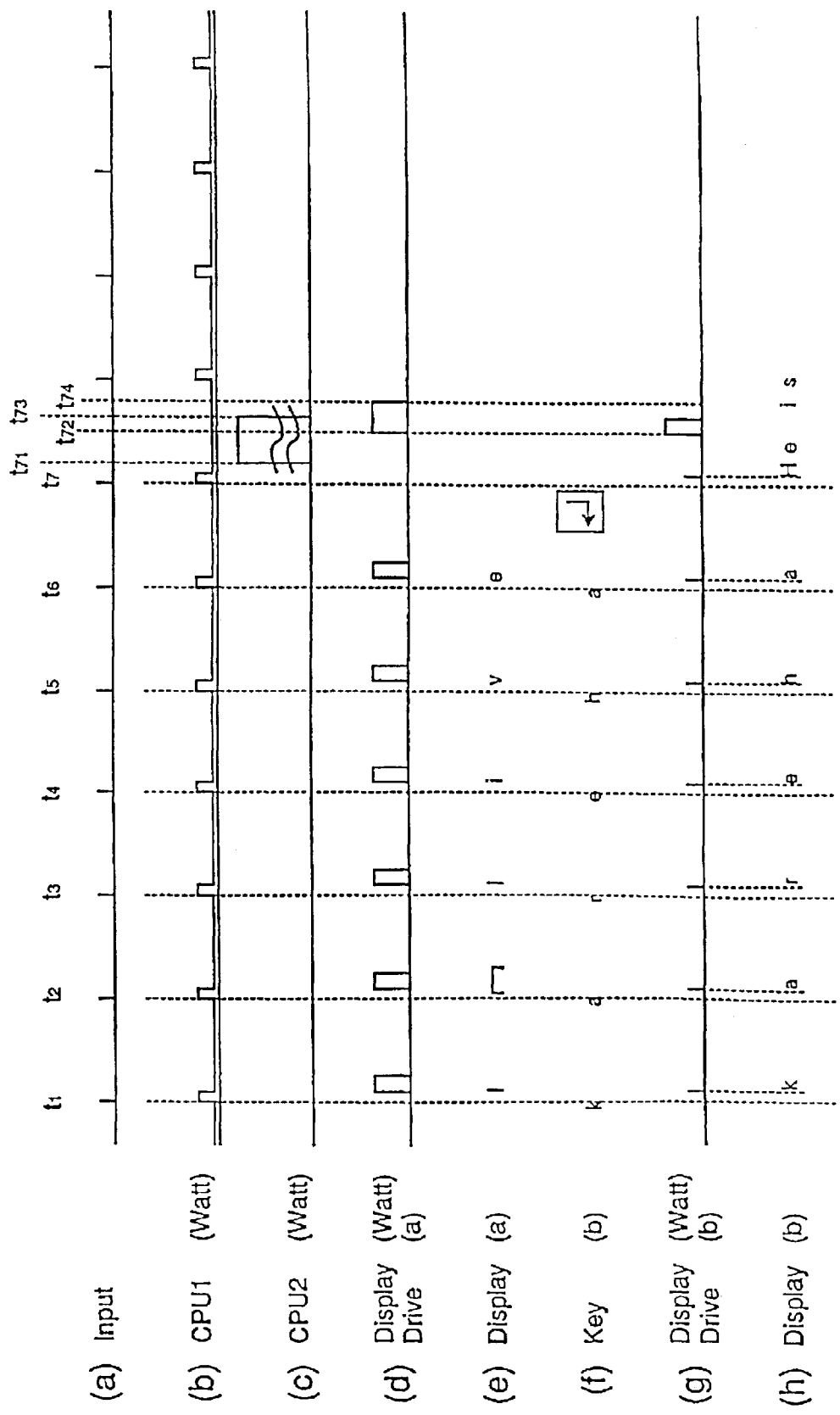
FIG. 12 is a timing chart.
Figure 17:
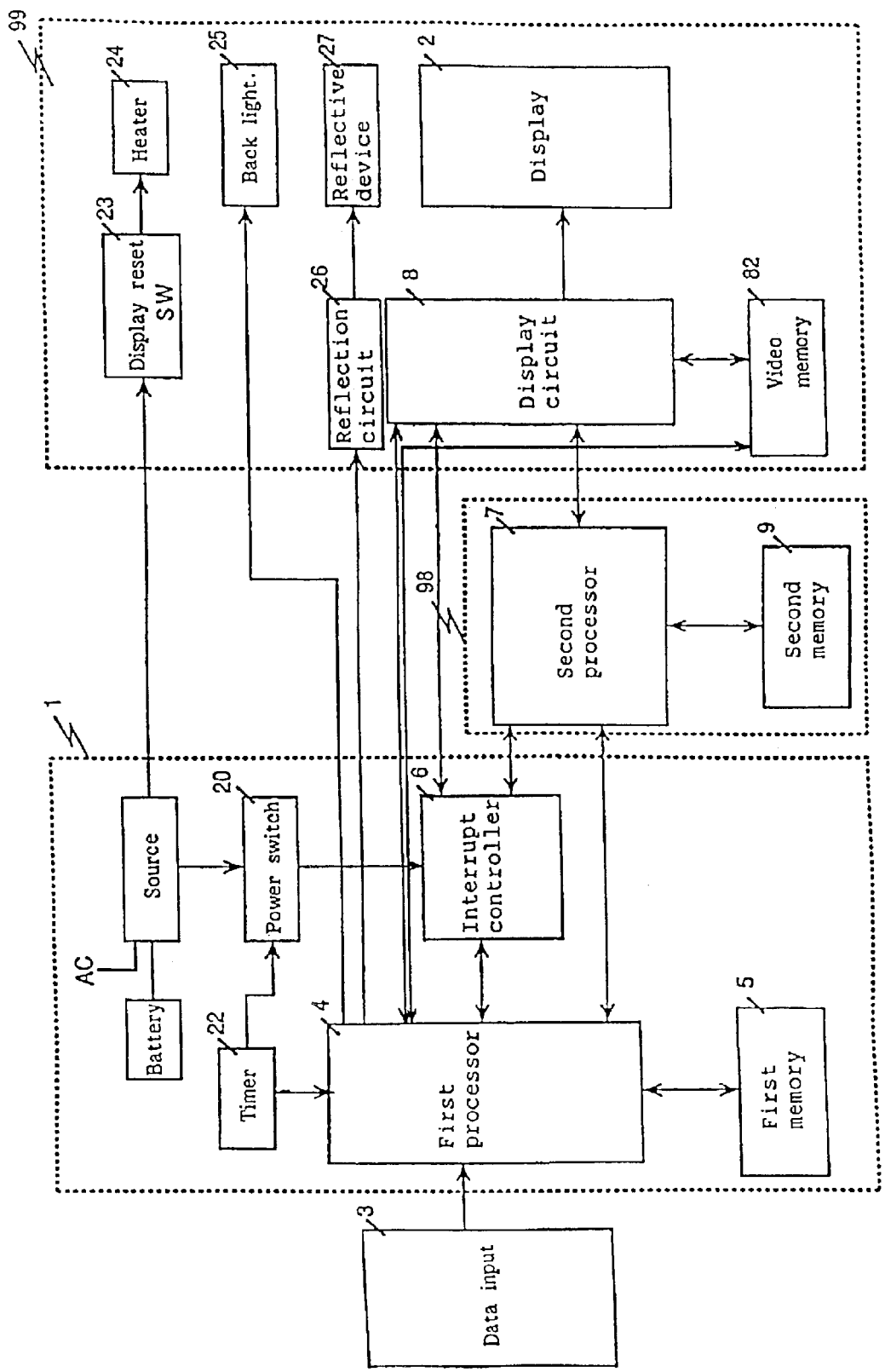
FIG. 17 is a block diagram showing a modification of the second embodiment.

For a more particular explanation, the processing action of corresponding components when the key entry is made is illustrated in FIG. 12. When the key entry with "I" is conducted at t1 as shown in FIG. 12-e, the first processor 4 shifts input data into a letter "I" code, reads a font pattern of the letter code from the first font ROM 40 shown in FIG. 10, and actuates the display circuit for display of the letter "I" on the display 2. With the memory effect display having ferroelectric crystal liquid, partial replacement in a character can be made. The partial replacement is feasible in two different manners; one for change dot by dot and the other for change of a vertical or horizontal line of dots at once. The dot-by-dot change is executed with less energy requirement but at a higher voltage, thus resulting in high cost. The line change has to be done in the group of dots at once even when one dot only is replaced but at relatively lower voltages. Both manners in this embodiment will now be explained.

When the horizontal and vertical drivers 11, 12 shown in FIG. 3 accept higher voltages, it is possible to fill the dots forming the letter "I" one by one. Accordingly, the letter "I" can be displayed by having a font data of a corresponding character pattern supplied from the first processor 4. However, ICs accepting such a high voltage are costly. It is thus desired for cost saving that the operating voltage is low. It is now understood that every data processing apparatus is preferably arranged, in view of capability of up-to-date semiconductors, for providing line-by-line text change operation.

It is also necessary that the first memory 5 of the first processor 4 carries at least data of one text line.

For Japanese characters, the one text line data is equal to 640×24 dots. The writing of the letter "I" thus involves replacement of 24 of 640-dot lines.

In operation, the previous data of a target line is retrieved from the image memory 41 of the first memory 5 and also, the pattern data of the letter "I" is read from the first font ROM 40. Then, the two data are combined together to a composite data which is then fed to the display circuit 8 for rewriting of one text line on the display 2. Simultaneously, the same data is stored into the image memory 41. The input of "I" is now completed.

None of the first font ROM 40 and the image memory 41 is needed when the second font ROM 43 is employed for the same operation, which is capable of processing coded data. In particular, the same text line can be expressed with about 40 of 2-byte characters and thus, 40×2=80 bytes per line. Therefore, the first memory 5 may carry coded data of the entire screen image.

During the processing of data input "I" in either of the two foregoing manners, the second processor 7 provides no processing action as shown in FIG. 12-c.

Similarly, a series of key inputs are prosecuted by the first processor 4, "space" at t2, "L" at t3, "i" at t4, "v" at t5, and "e" at t6. Although the first processor 4 is much slower in the processing speed than the second processor 7, the replacement of one text line on display can be pursued at an acceptable speed with less energy consumption.

As shown in FIG. 12, t7 represents the key input of an instruction for processing a large amount of data, e.g. spelling check in word processing, translation from Japanese to English, conversion of Japanese characters into Chinese characters, or calculation of chart data.

When the first processor 4 determines that the processing at the second processor 7 is needed, the second processor 7 is turned on at t71. The start-up of the second processor 7 is the same as of Embodiment 1. As shown in FIG. 12-c, the second processor 7 upon being activated at t71 returns to the original state prior to interruption and starts processing the data of text lines fed from the first processor 4. As the processing is prosecuted, each character of changed text is displayed on the display 2 through the display circuit 8 as shown at t72 in FIG. 12-d.

This procedure will now be explained in the form of data entry for translation from Japanese to English. After the letter k is input at t1, as shown in FIG. 12-f, and displayed on the screen, as shown in FIG. 12-h. Then, the letter a is input at t2 and the display reads "ka" as shown in FIG. 12-h.

By then, the second processor 7 remains inactivated as shown in FIG. 12-c. When a key of translating conversion is pressed at t7, the second processor 7 starts processing at t71. Accordingly, the Japanese paragraph "kareha" is translated to "He is" in English. The resultant data is sent to the display circuit 8 for dot-by-dot replacement for display.

Now, the display reads "He is" as shown in FIG. 12-h. The dot-by-dot character replacement shown in FIG. 12-g requires less electric energy than the text line replacement shown in FIG. 12-d.

For the purpose of saving energy during the movement of the cursor, the black/white inversion or negative mode is used as shown in FIGS. 13-a and 13-b. This however increases the power consumption in the line replacement. When a bar between the lines is used for display of the cursor as shown in FIGS. 13-c and 13-d, the replacement of the full line is not needed and thus, energy saving will be expected. Also, the speed of processing is increased and the response will speed up during processing with the low speed first processor 4. This advantage is equally undertaken in the dot-by-dot replacement.

As shown in FIG. 14-a, the movement of the cursor is expressed by the bar. For ease of viewing, the bar may be lit at intervals by means of control with the first processor 4. When a key data input is given, a corresponding character is displayed in the reverse color as shown in FIG. 14-b. This technique will also reduce the energy consumption at least during the cursor movement.

FIGS. 14-a to 14-g illustrate the steps of display corresponding to t1 to t7. FIG. 14-h shows the conversion of the input text.

FIGS. 15-a to 15-f shows the insertion of a word during dot-by-dot replacement. It is necessary with the use of the second font ROM 43 in the arrangement shown in FIG. 10 that the data of one text line is saved in the image memory 41 because the first font ROM 40 does not carry all the Chinese characters. When the cursor moves backward as shown in FIGS. 15-c and 15-d, the letter n is called back from the image memory 41. Accordingly, the data prior to insertion can be restored without the use of the second processor 7 or the second front ROM 43 as shown in FIG. 15-d.

FIGS. 16-a to 16-g show the copy of a sentence "He is a man". The procedure from FIG. 16-a to FIG. 16-f can be carried out with the first processor 4. The step of FIG. 16-g involves an insertion action which is executed by the second processor 7.

According to the second embodiment, most of the job which is processed by the second processor 7 in the first embodiment is executed by the low power consuming first processor 4. Thereby, the average energy consumption will be much lower than that of the first embodiment.

The optimum of a job sharing ratio between the first and second processors 4 and 7 may vary depending on particulars of a program for e.g. word processing or chart calculation. Hence, a share of the first processor 4 in operation of a software program can be controlled by adjustment on the program so as to give an optimum balance between the energy consumption and the processing speed. Also, a video memory 82 may be provided in the display block 99 for connection via a connecting line 96 with the first processor 4. This allows the data prior to replacement to be stored in the video memory 82 and thus, the image memory 41 shown in FIG. 10-a will be eliminated.

Embodiment 3

Figure 18:
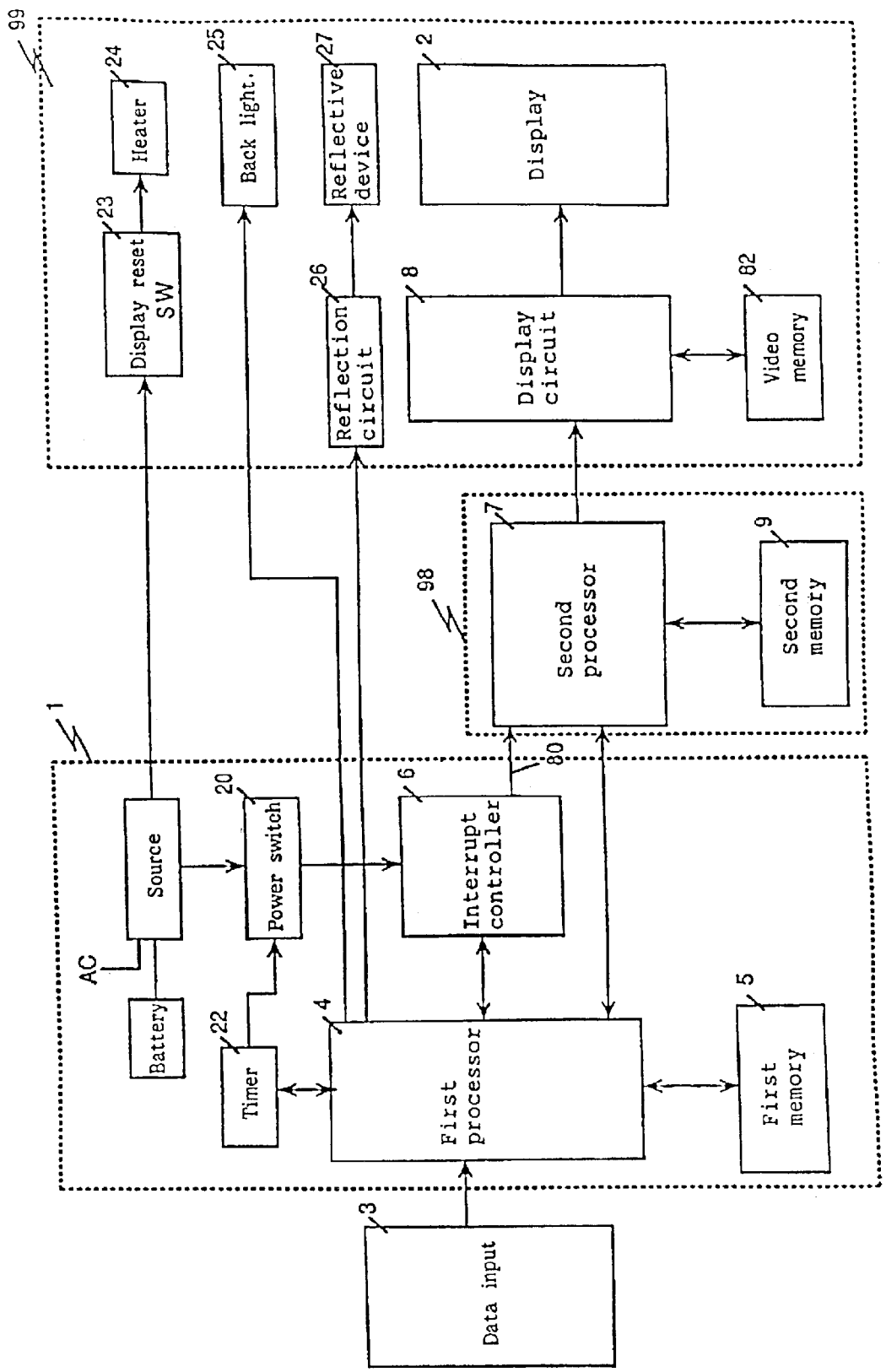
FIG. 18 is a block diagram showing a third embodiment of the present invention.

FIG. 18 is a block diagram showing a third embodiment of the present invention. The difference of the third embodiment from the first and second embodiments will now be described. As shown in FIG. 1, the first embodiment has the display start instruction line 81 along which both a start instruction and a stop instruction are transferred from the first processing block 1 to the display block 99 while equal instructions are transferred by the start instruction line 80 from the same to the second processing block 98.

The third embodiment contains no display start instruction line 81 to the display block 99 as shown in FIG. 18. Also, the start instruction line 80 of the third embodiment allows only a start instruction but not a stop instruction to be transmitted from the first processing block 1 to the second processing block 98.

Figure 19:
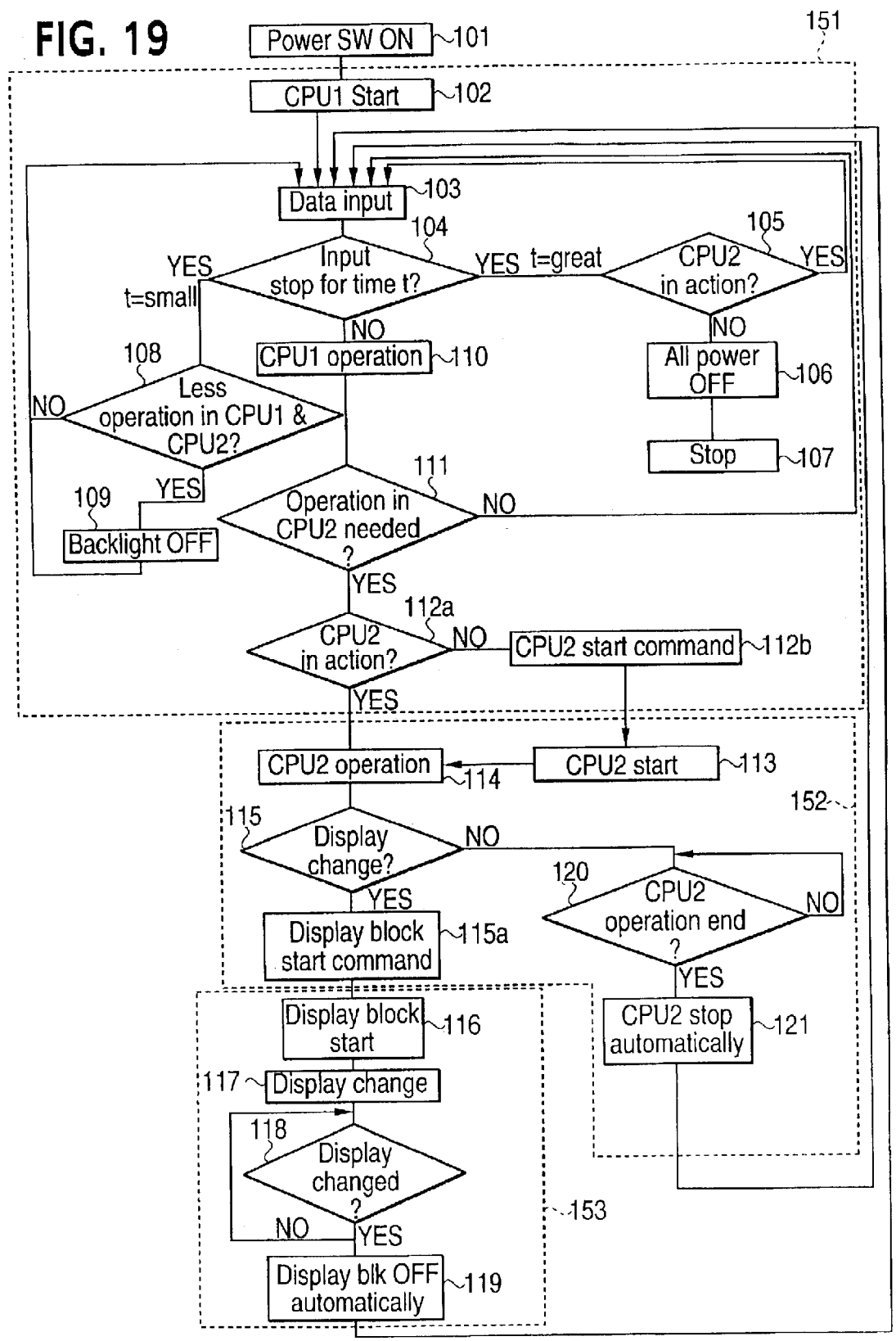
FIG. 19 is a flow chart.

The second processor 7 stops itself upon finishing the processing and enters into the energy saving mode. When the second processor 7 determines that the display change is needed, it delivers a display start instruction via a data line 84 to the display block 99 which is then activated. After the display change on the display 2 is completed, the display block 99 stops operation and enters into the display energy saving mode. This procedure will be explained in more detail using a flow chart of FIG. 19. The flow chart is composed of a first processing step group 151, a second processing step group 152, and a third processing step group 153. At first, the difference of this flow chart will be described in respect to the sequence from start to stop of the second processing block 98.

Figure 6:
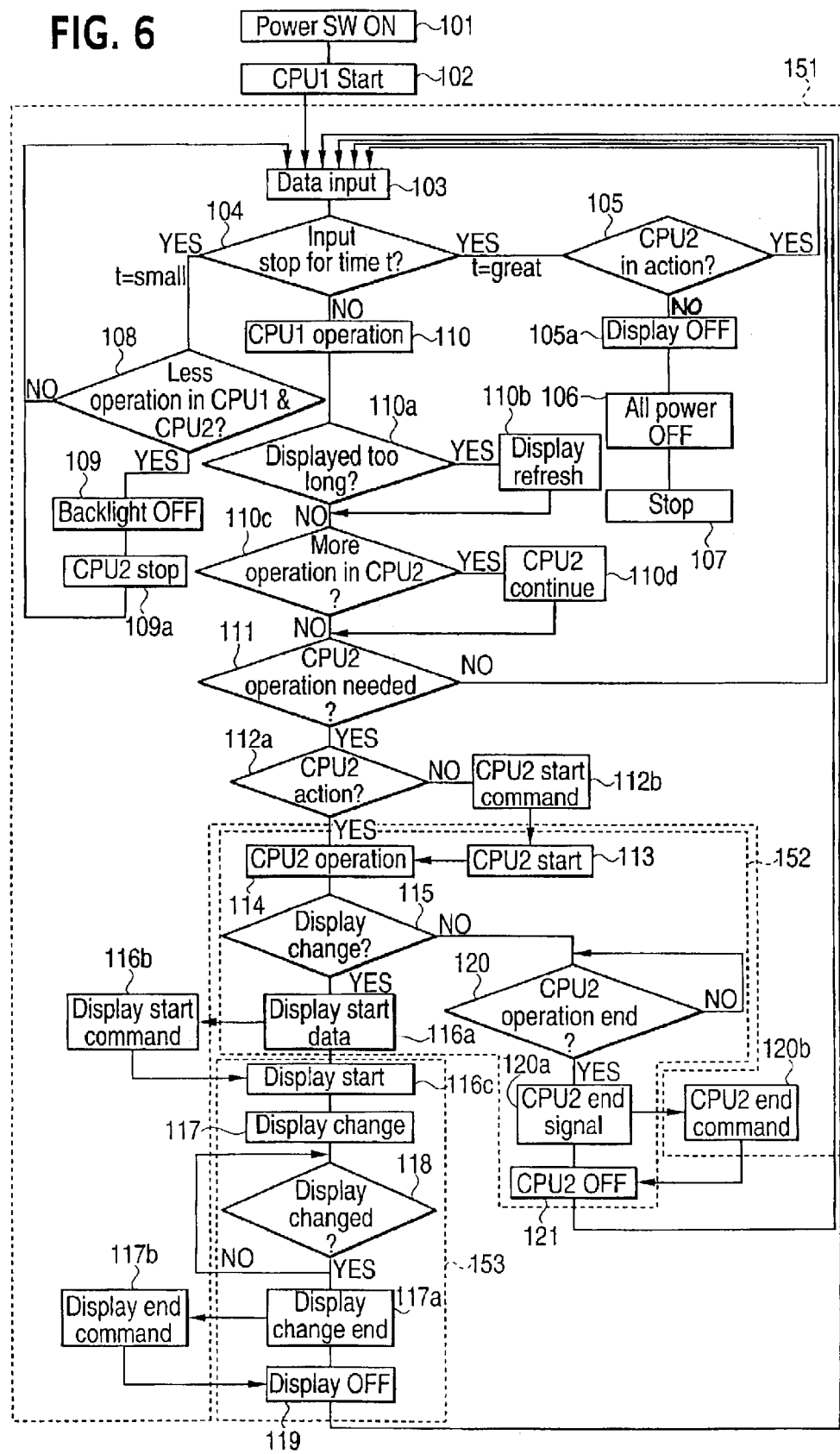
FIG. 6 is a flow chart.

There is no control flow from the second processing step group 152 of the second processing block 98 to the first processing step group 151, unlike the flow chart of the first embodiment shown in FIG. 6. More specifically, the first processor 4 delivers, at Step 112, a start instruction to the second processor 7 which is then activated. This step is equal to that of the first embodiment. However, the second processor 7 is automatically inactivated at Step 121, as compared with de-energization by an instruction from the first processor 4 in the first embodiment. At Step 103, the second processor 7 is turned to a data input stand-by state.

The difference will further be described in respect to the sequence from start to stop of the display block 99.

In the first embodiment, a display start instruction to the display block 99 is given by the second processor 7 after completion of display data processing. According to the third embodiment, the start instruction is delivered by the second processing block 98 to the display block 99, at Step 115a shown in FIG. 19. Then, the display block 99 is activated at Step 116 and the display change is conducted at Step 117. After the display change is examined at Step 118, the display block 99 stops itself at Step 119.

As understood, the third embodiment which is similar in the function to the first embodiment provides the self-controlled de-energization of both the second processing block 98 and the display block 99.

Also, a start instruction to the display block 99 is given by the second processing block 98. Accordingly, the task of the first processing block 1 is lessened, whereby the overall processing speed will be increased and the arrangement itself will be facilitated.

Embodiment 4

Figure 20:
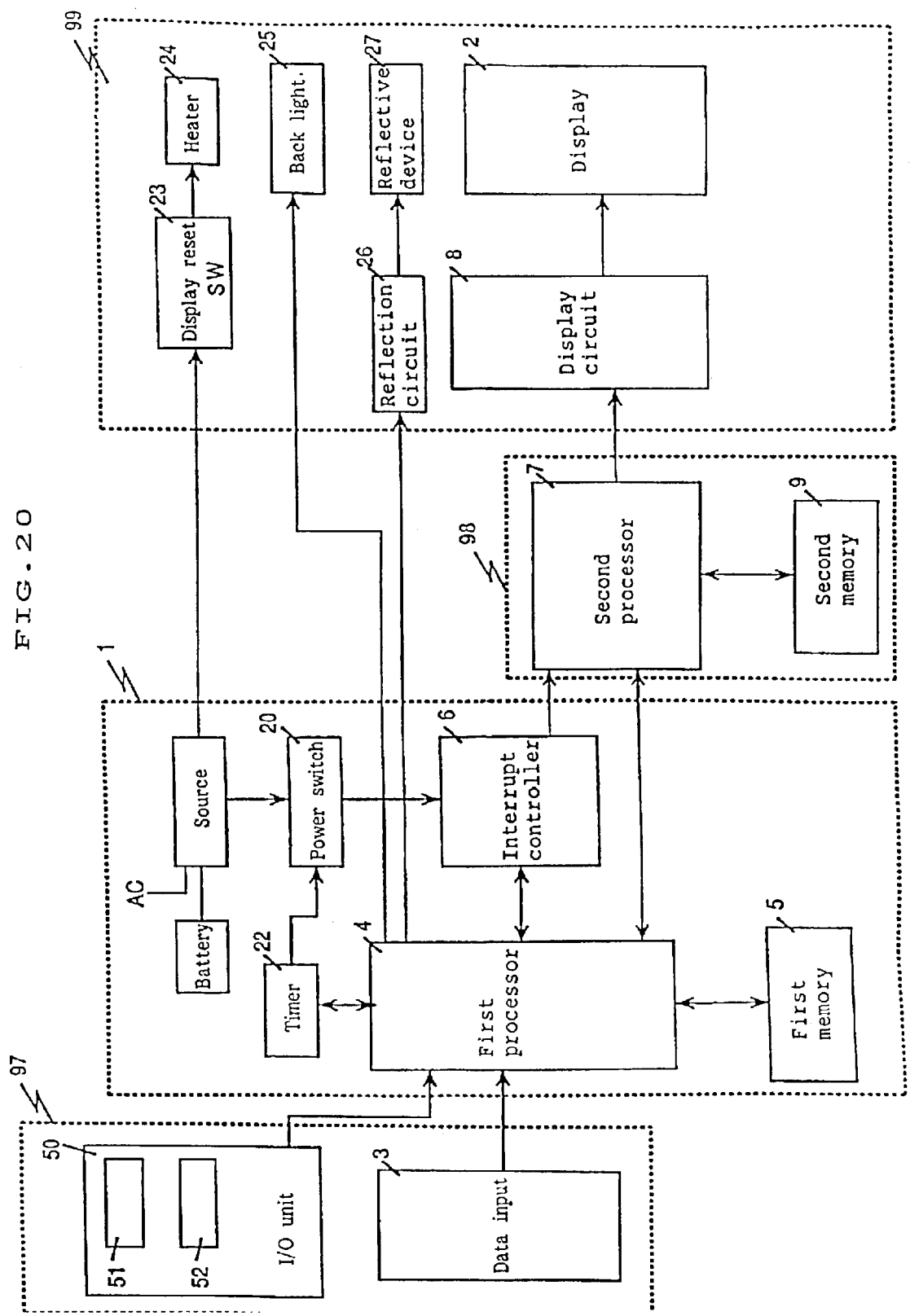
FIG. 20 is a block diagram showing a fourth embodiment of the present invention.
Figure 21:
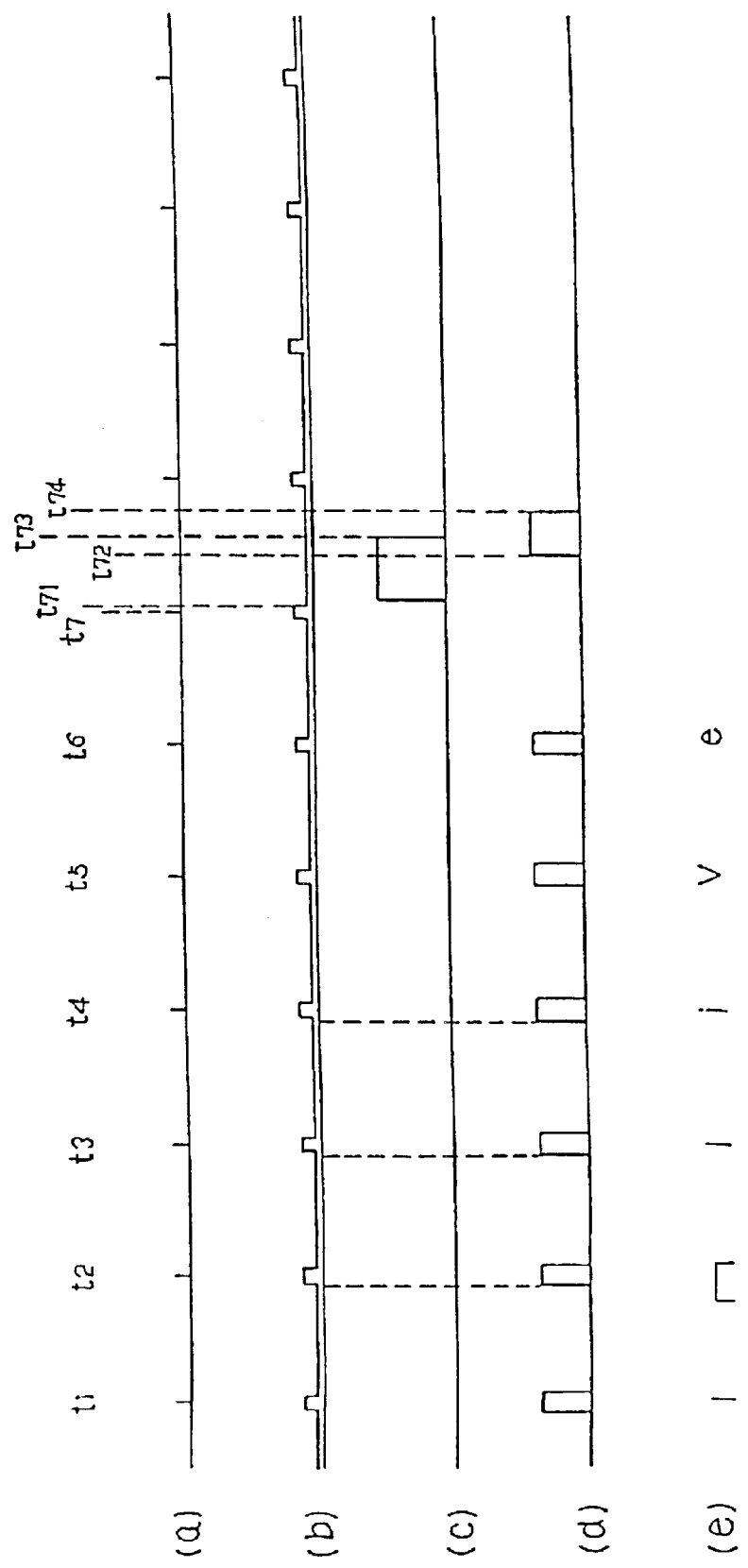
FIG. 21 is a timing chart of the fourth embodiment.

FIG. 20 is a block diagram showing a fourth embodiment of the present invention, in which an energy saving manner is disclosed with the use of an input/output port for communications with the outside. A data processing apparatus of the fourth embodiment incorporates an input/output unit 50 mounted in its data input block 97. The input/output unit 50 contains a communications port 51 and an external interface 52. In operation, the unit 50 performs actions as shown in a timing chart of FIG. 21 which is similar to the timing chart of key data entry shown in FIG. 12. When a series of inputs from the communications port are introduced at t1 to t74, as shown in FIG. 21-a, the input/output unit 50 delivers corresponding signals to the first processing block 1. The first processor 4 sends an input data at t1 to the display circuit 8 which in turn actuates, as shown in FIG. 21-d, for display of a data string as illustrated in FIG. 21-e. If an input at t7 is bulky, the second processor 7 is activated at t71 as shown in FIG. 21-c.

The second processor 7 delivers a start instruction at t72 to the display circuit 8 which is then actuated for data replacement on the display 2. If the input through the communications port is not bulky, it is processed in the first processor 4 or the input/output unit 50 while the second processor 7 remains inactivated. Accordingly, energy saving during the input and output action will be ensured.

Embodiment 5

Figure 22:
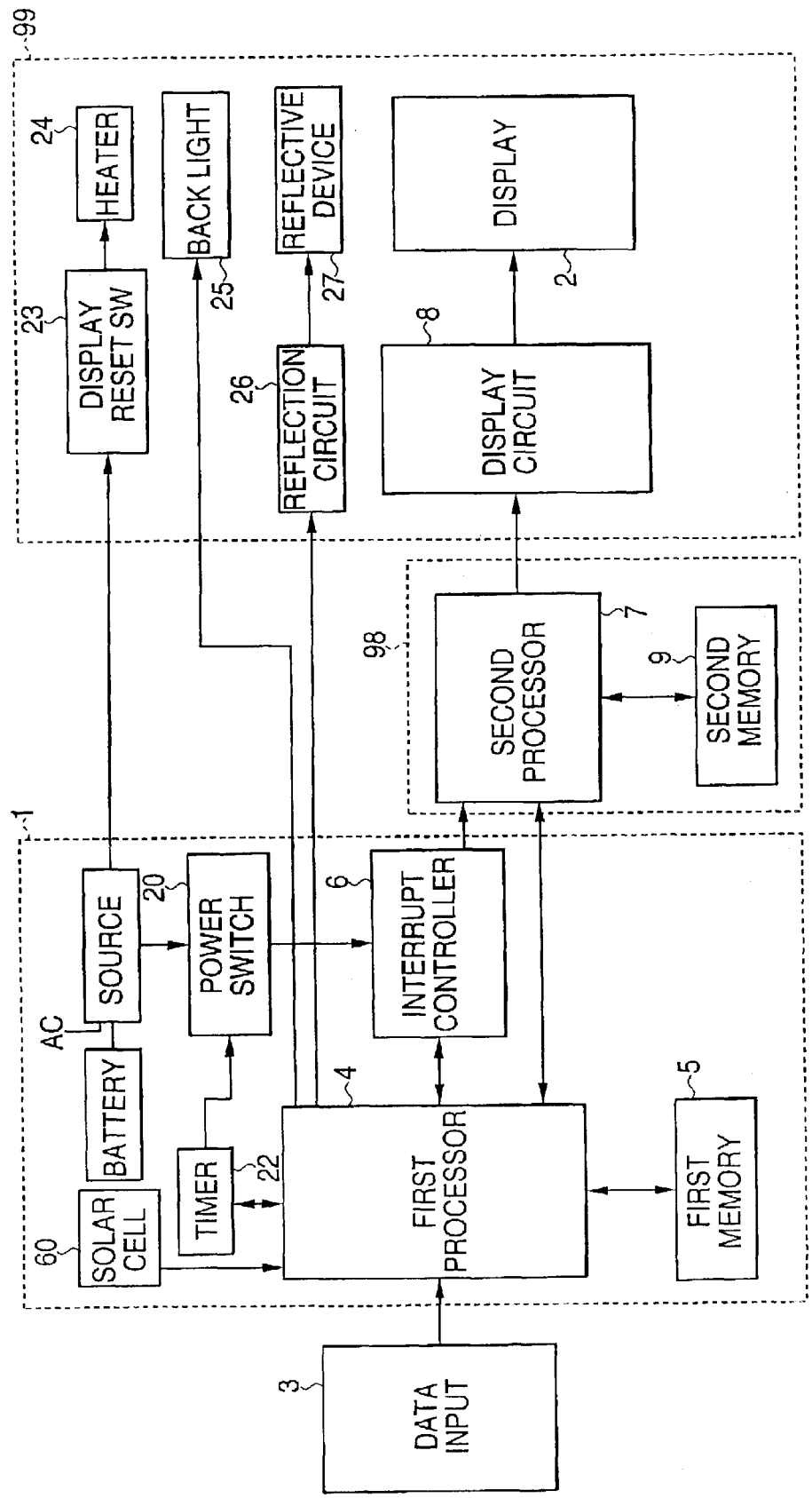
FIG. 22 is a block diagram showing a fifth embodiment of the present invention.
Figure 23:
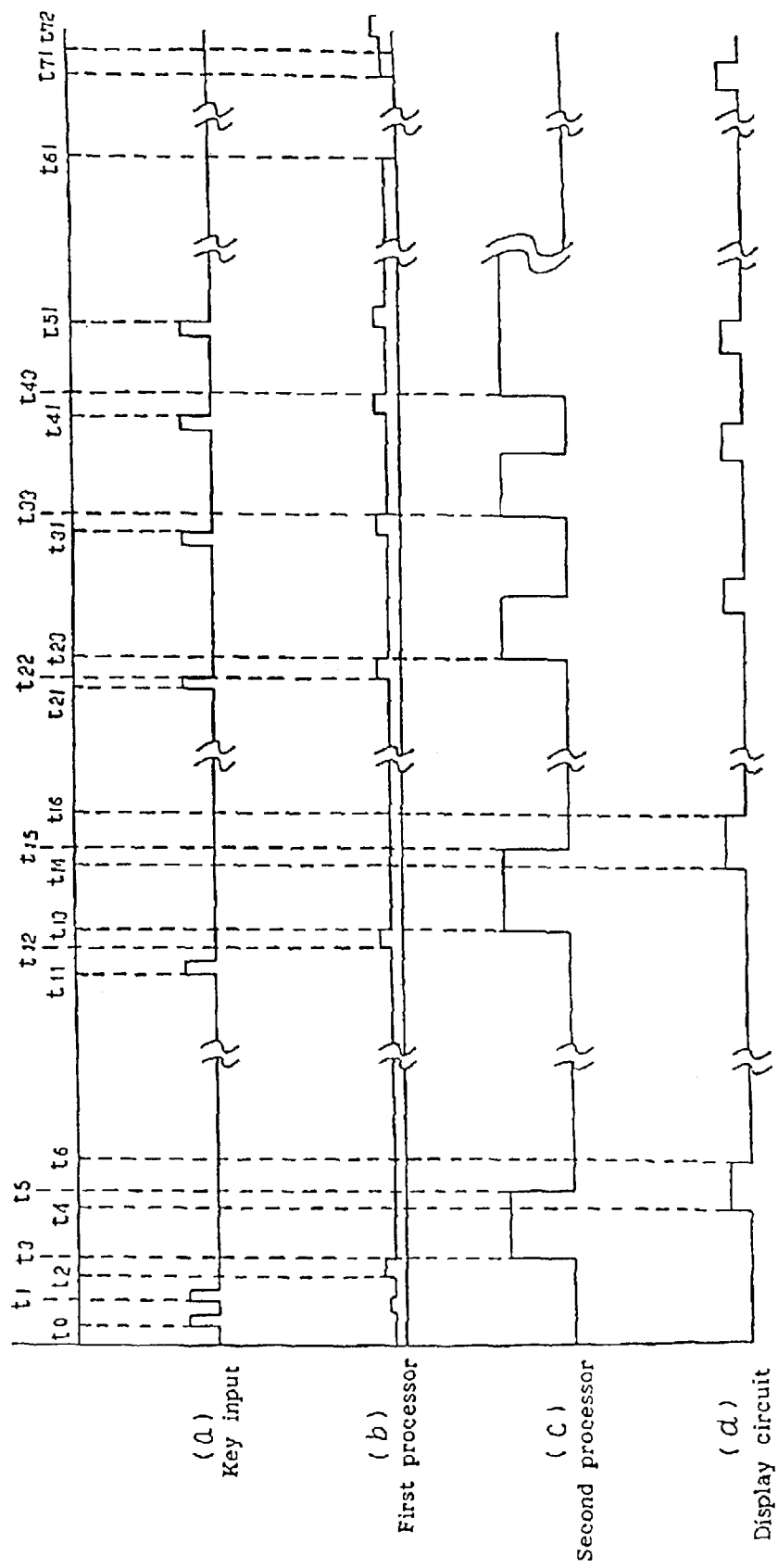
FIG. 23 is a timing chart of the fifth embodiment.

FIG. 22 is a block diagram showing a fifth embodiment of the present invention, in which a solar battery 60 is added as an extra power source. The first processor 4 operates at low speeds thus consuming a small amount of electric energy. Accordingly, the apparatus can be powered by the solar battery 60. While the action is almost equal to that of the first embodiment, the solar battery however stops power supply when the amount of incident light is decreased considerably. If the supply is stopped, it is shifted to from the source 61. When no key entry is made throughout a length of time and no power supply from the solar battery 60 is fed, the source stop mode is called for as shown in FIG. 23-b. The first processor 4 saves processing data into the first memory 5 and then, stops operation. Thus, the power consumption will be reduced. When a power supply from the solar battery 60 is fed again at t71 or another key input data is fed from the data input unit 3, the first processor 4 starts actuating for performance of an equal action from t72.

Figure 24:
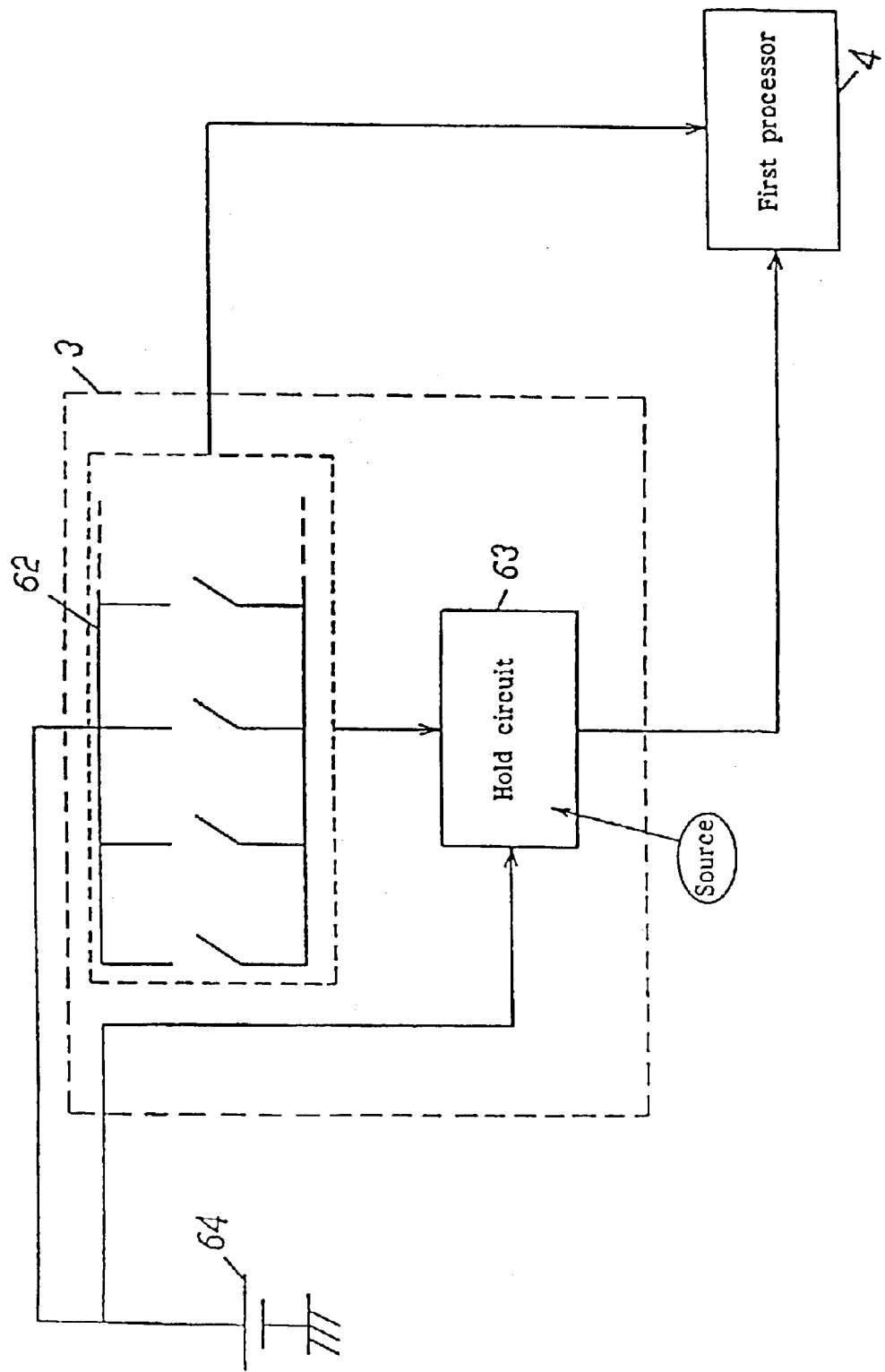
FIG. 24 is a block diagram showing a data input unit.

One example of the start procedure of the first processor 4 will now be described. As shown in FIG. 24, a key input device 62 of the data input unit 3 feeds a voltage from the battery 64 to a hold circuit 63. The hold circuit 63 upon pressing of a key connects the power source to the first processor 4 for energization. Simultaneously, the key input device 62 transfers a key input data to the first processor 4 and processing will start.

Each key of the key input device 62 may have a couple of switches; one for power supply and the other for data entry.

Accordingly, as the solar battery is equipped, the power consumption will be minimized and the operating life of the apparatus will last much longer.

The solar battery 60, which becomes inactive when no incoming light falls, may be mounted on the same plane as of the display 2 so that no display is made including text and keyboard when the solar battery 60 is inactivated.

Hence, no particular trouble will arise in practice. In case of word processing in the dark e.g. during projection of slide pictures in a lecture, a key entry action triggers the hold circuit 3 for actuation of the first processor 4.

Figure 25:
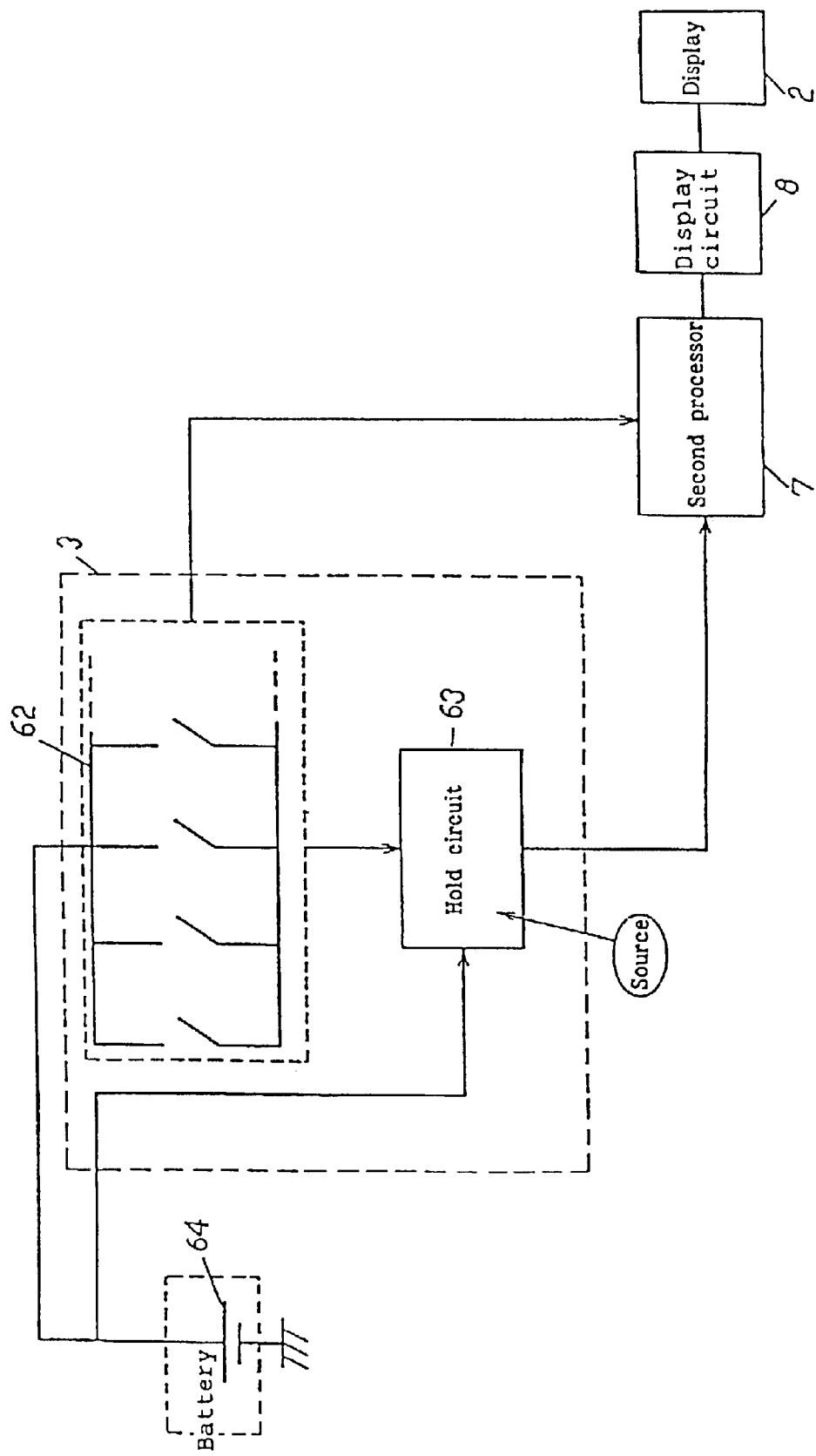
FIG. 25 is a block diagram showing a combination of the first and second processing units.

As the data processing apparatus of the fifth embodiment provides more energy saving, it may be realized in the form of a note-size microcomputer featuring no battery replacement for years. Also, the first and second processors in any of the first to fifth embodiments may be integrated to a single unit as shown in FIG. 25.

It was found through experiments of simulative calculation conducted by us that the average power consumption during a word processing program was reduced from 5 w of a reference value to as small as several hundredths of a watt when the present invention was associated. This means that a conventional secondary cell lasts hundreds of hours and a primary cell, e.g. a highly efficient lithium cell, lasts more than 1000 hours. In other words, a note-size computer will be available which lasts, like a pocket calculator, over one year in use of 5-hour a day without replacement of batteries. As understood, intensive attempts at higher-speed operation and more-pixel display are concurrently being prosecuted and also, troublesome recharging of rechargeable batteries needs to be avoided. The present invention is intended to free note-size computers from tangling cords and time-consuming rechargers.

The advantages of high speed and high resolution attributed to ferroelectric liquid crystal materials have been known.

The present invention in particular focuses more attention on the energy saving effects of the ferroelectric liquid crystal which have been less regarded.

No such approach has been previously made. The energy saving effects will surely contribute to low power requirements of portable data processing apparatuses such as note-size computers.

Although the embodiments of the present invention employ a display device of ferroelectric liquid crystal for utilization of memory effects, other memory devices of smectic liquid crystal or electrochromic material will be used with equal success. The liquid crystal display is not limited to a matrix drive as described and may be driven by a TFT drive system.

What is claimed is:

1. A data processing apparatus comprising:
   a back light;
   a liquid crystal display unit having a transparent display mode for transmission of light from said back light, and a reflection display mode for reflection of light incoming from a display side of said liquid crystal display unit;
   a data input unit operable to input external data into said data processing apparatus;
   a control unit operable to detect whether a data entry from said data input unit is absent for a predetermined time, and, when data entry from said data input unit is absent for the predetermined time or longer, stop supply of power to said liquid crystal display unit.

2. A data processing apparatus according to claim 1, wherein said control unit turns off said back light when data entry from said data input unit is absent for the predetermined time or longer.

3. A data processing apparatus according to claim 2, wherein said control unit activates said liquid crystal display unit when data is input into said data input unit after stopping of supply of power to said liquid crystal display unit.

4. A data processing apparatus according to claim 1, wherein said data input unit is operable to input the external data from a user.

5. A data processing apparatus according to claim 1, wherein said data input unit is operable to input the external data from a communication interface.

6. A data processing apparatus according to claim 1, wherein said data processing apparatus is a portable type computer.

7. A data processing apparatus according to claim 1, wherein:
   said liquid crystal display unit comprises a reflection layer having a plurality of apertures and a liquid crystal layer on the display side of said liquid crystal display unit toward said back light;
   said reflection layer reflects incoming light, which entered said liquid crystal display unit through said liquid crystal layer, to the display side through said liquid crystal layer; and
   said reflection layer transmits light, emitted from said back light through said plurality of apertures, to the display side through said liquid crystal layer.

* * * * *